June 12, 1928.  
L. R. HEISLER  
1,673,509  
POWER TRANSFER AND CONTROL DEVICE  
Filed June 17, 1926   13 Sheets-Sheet 1

INVENTOR  
Leo R. Heisler  
BY  
his ATTORNEYS

June 12, 1928.  L. R. HEISLER  1,673,509
POWER TRANSFER AND CONTROL DEVICE
Filed June 17, 1926  13 Sheets-Sheet 2

INVENTOR
Leo R. Heisler
BY
his ATTORNEYS

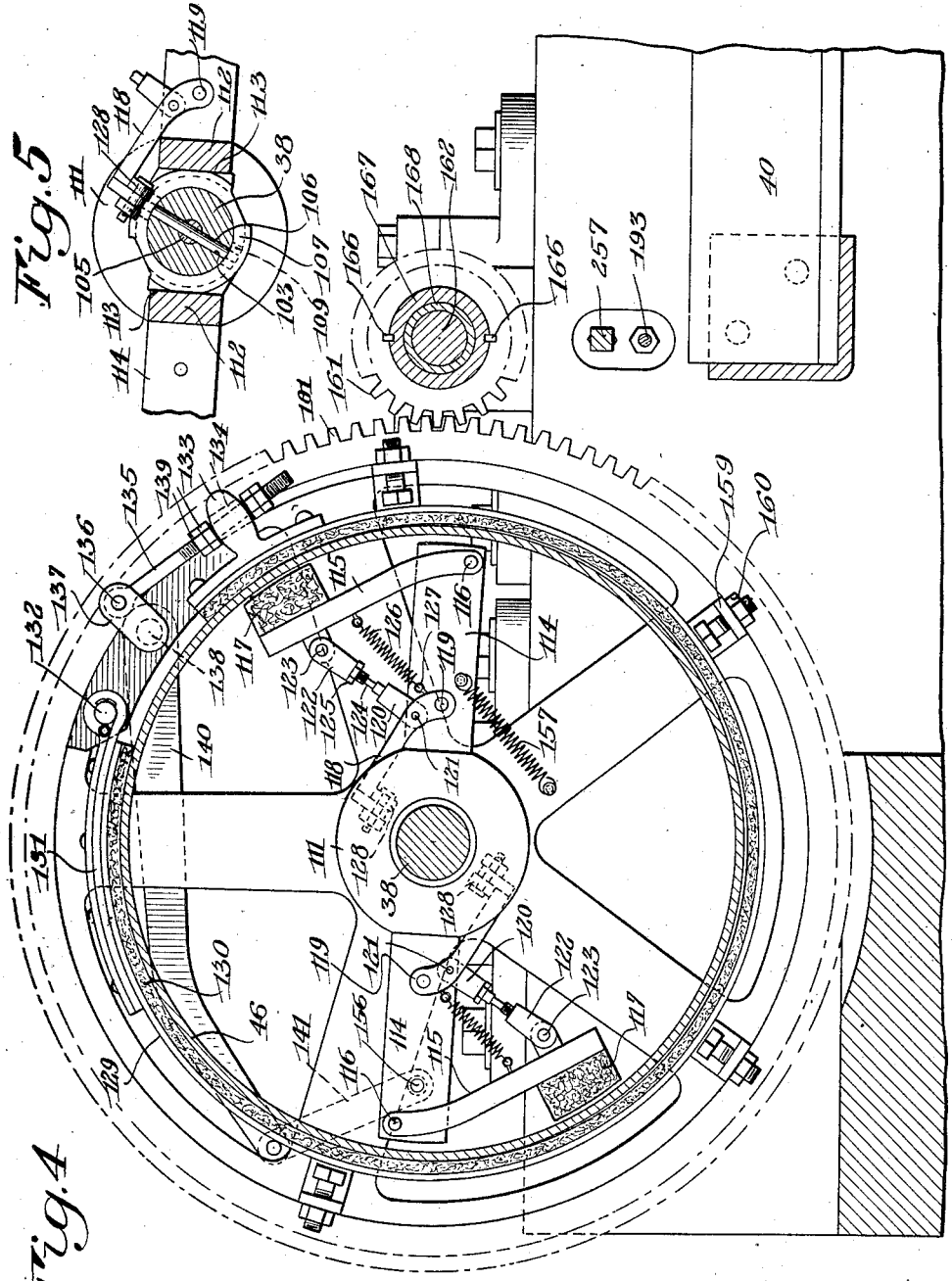

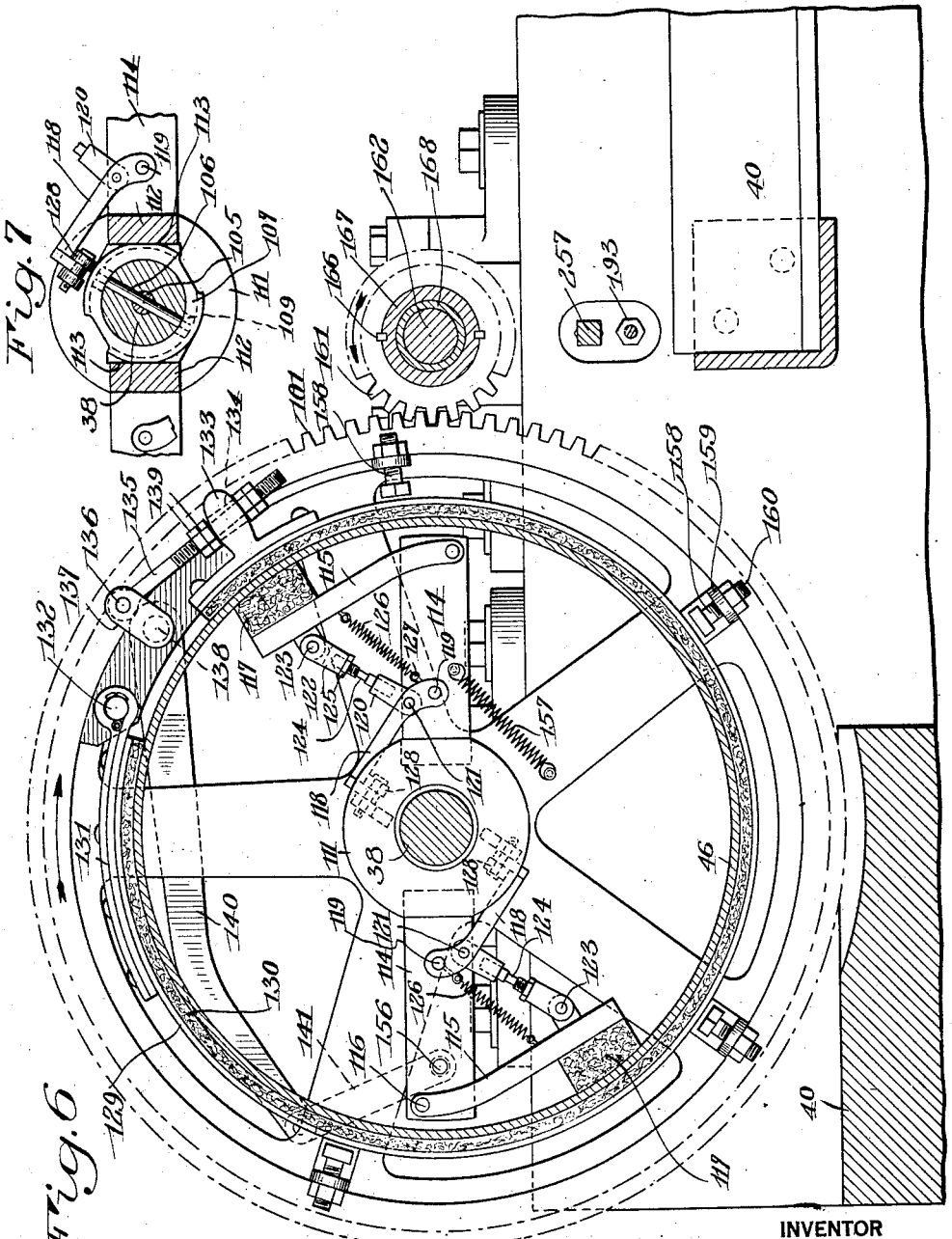

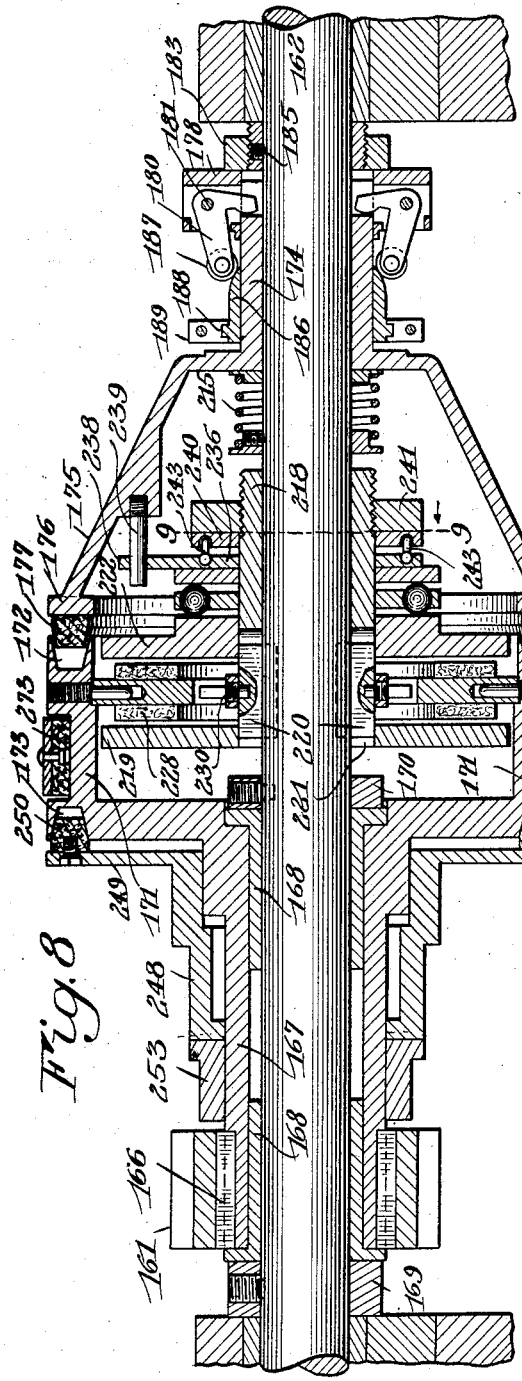

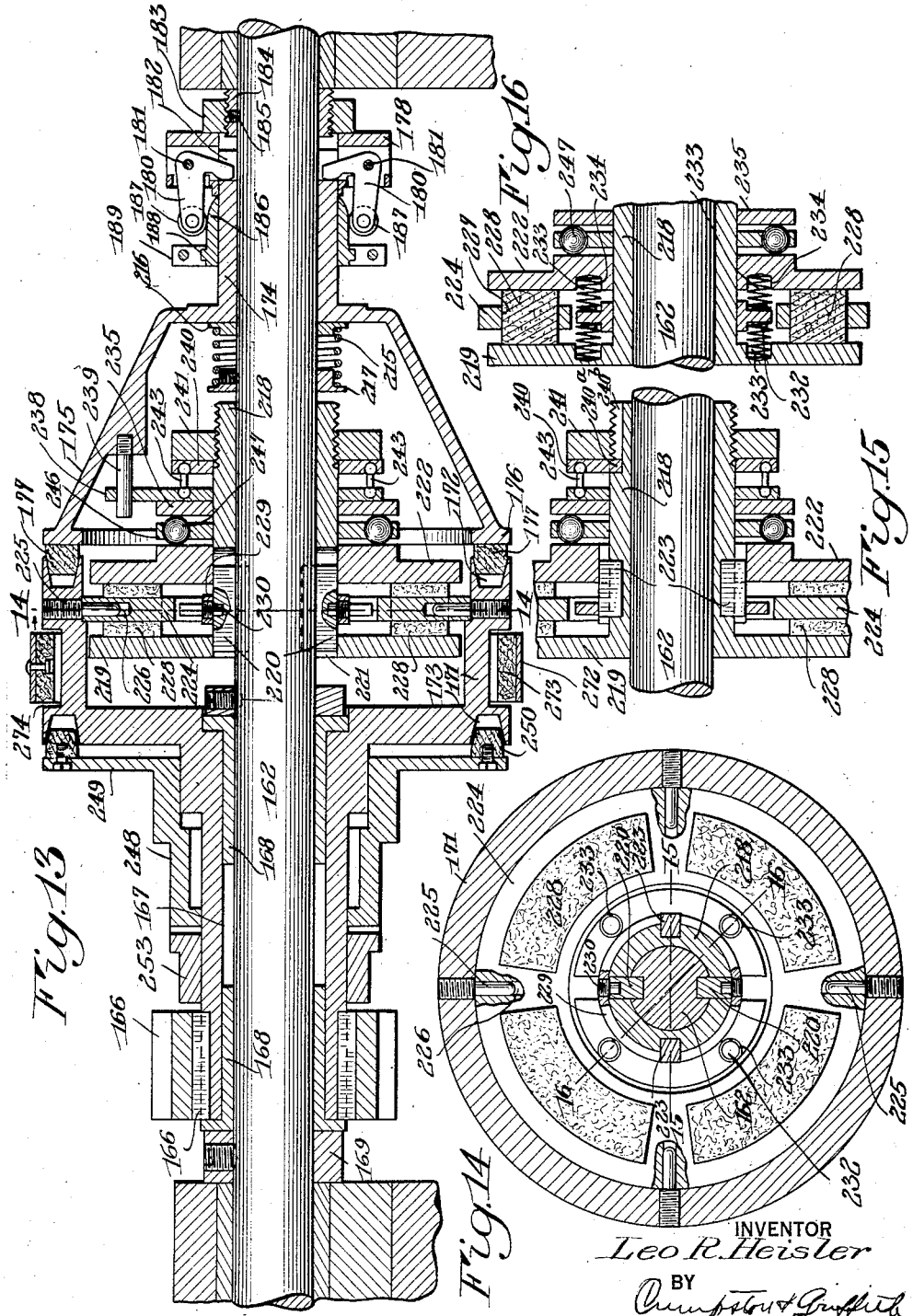

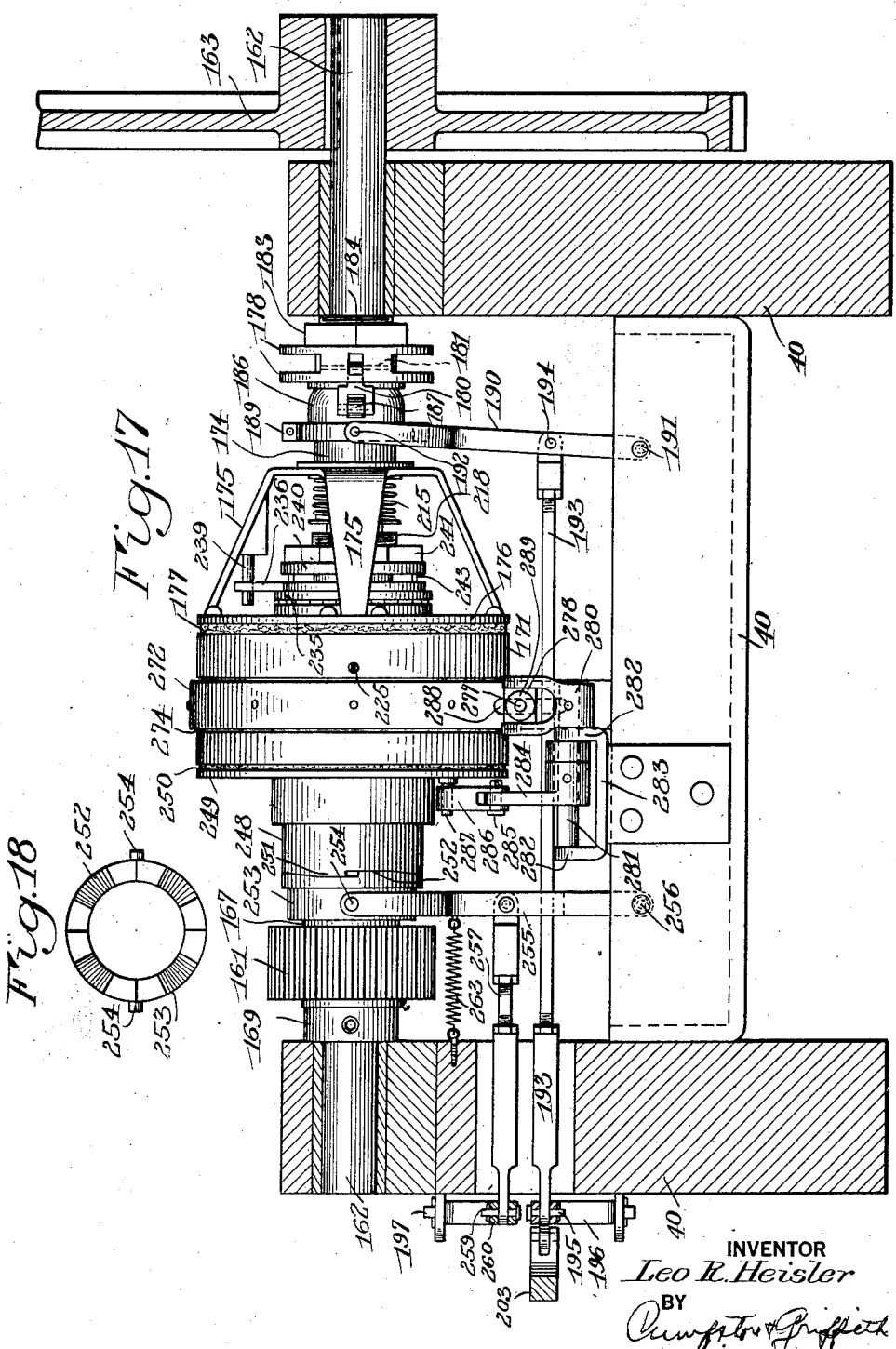

June 12, 1928.  
L. R. HEISLER  
1,673,509  
POWER TRANSFER AND CONTROL DEVICE  
Filed June 17, 1926  
13 Sheets-Sheet 2
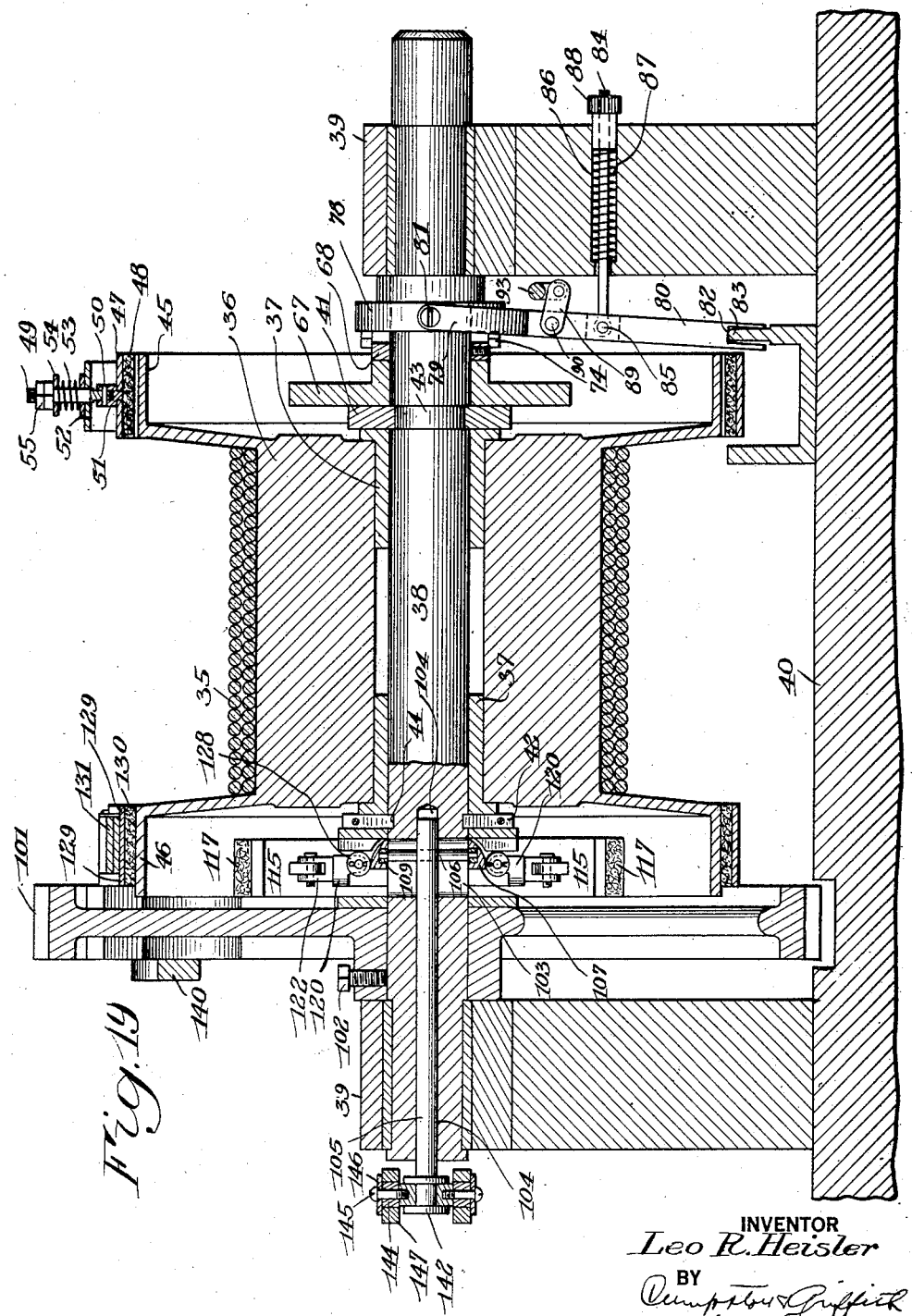
INVENTOR  
*Leo R. Heisler*  
BY  
*Dempster & Griffith*  
*his* ATTORNEYS

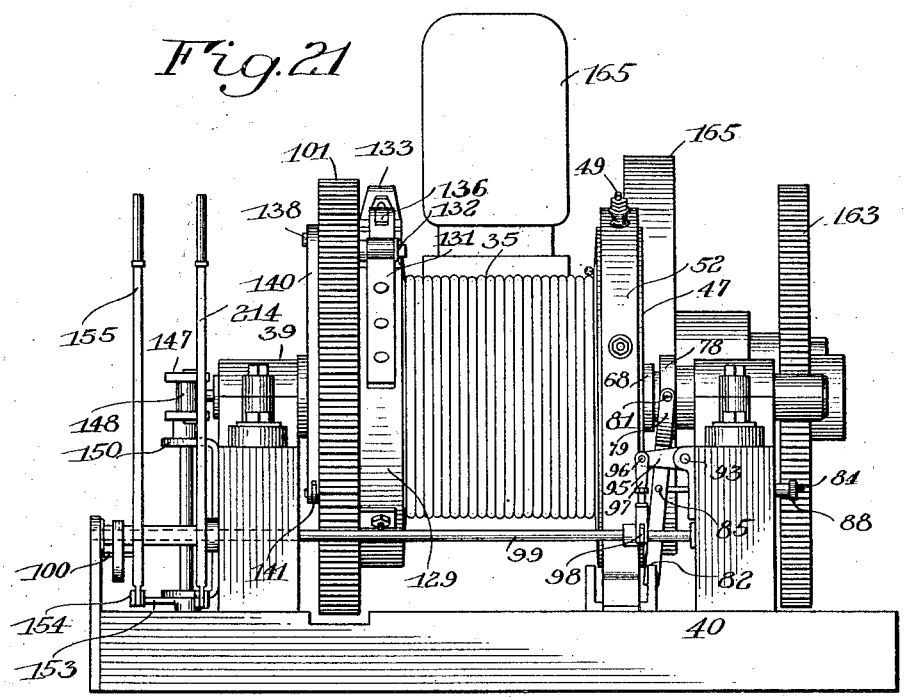
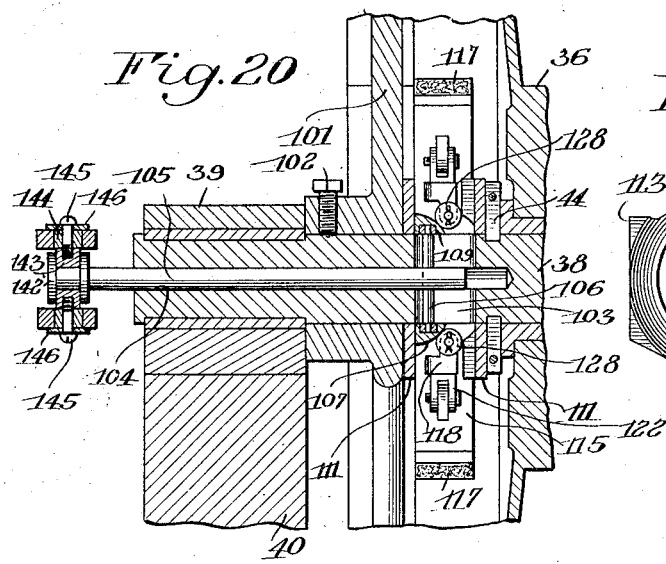
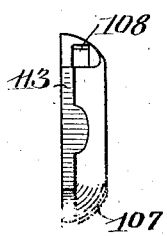

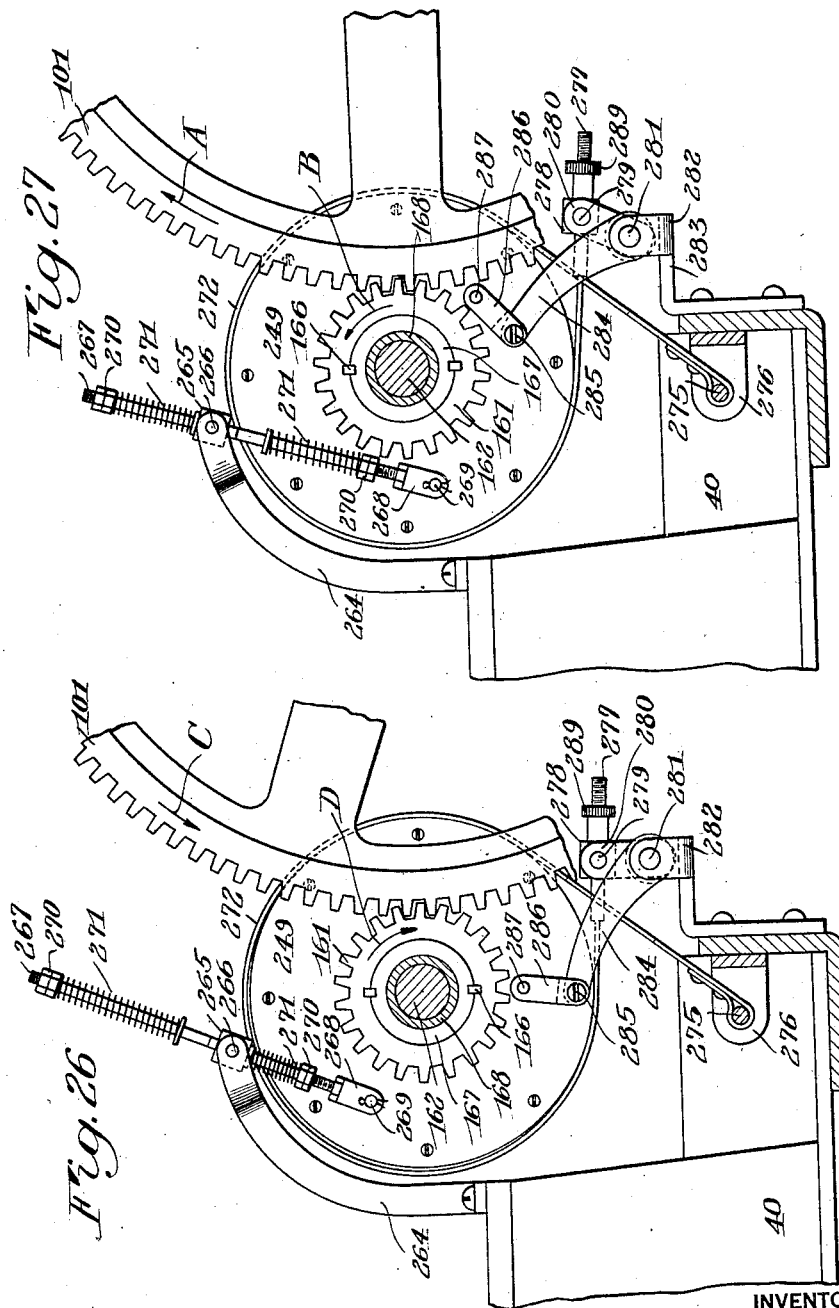

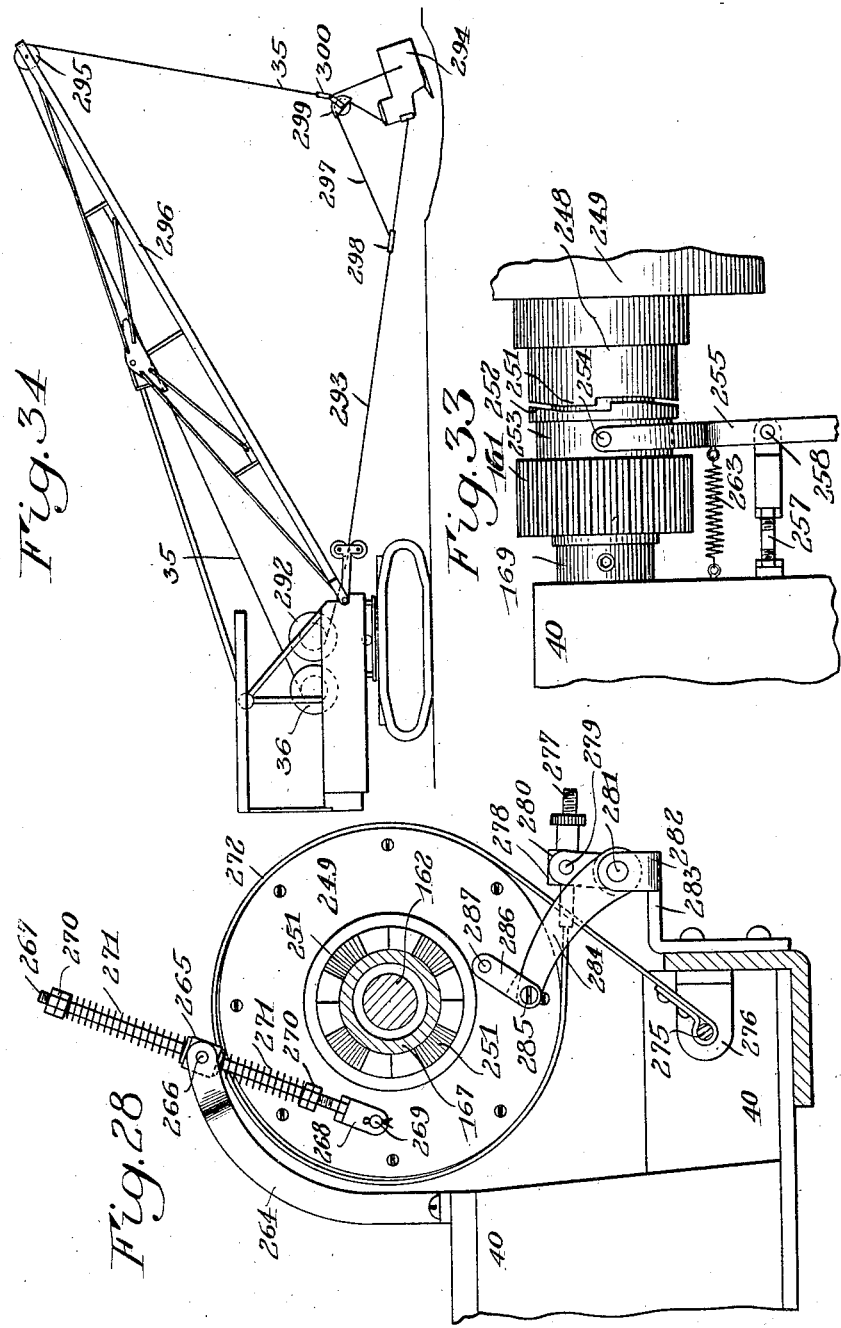

June 12, 1928.
L. R. HEISLER
1,673,509
POWER TRANSFER AND CONTROL DEVICE
Filed June 17, 1926   13 Sheets-Sheet 13
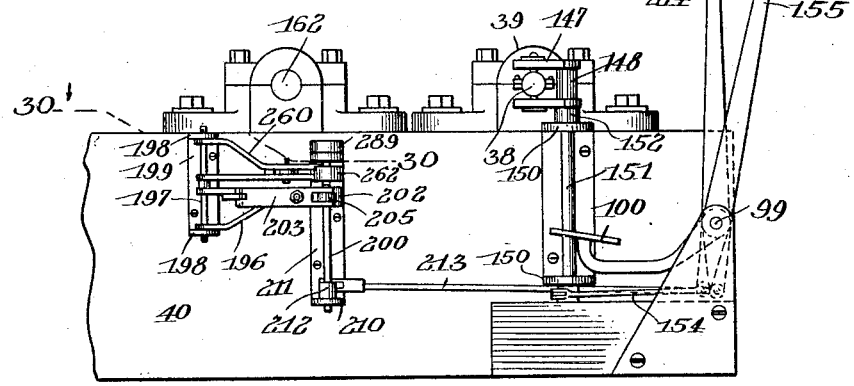
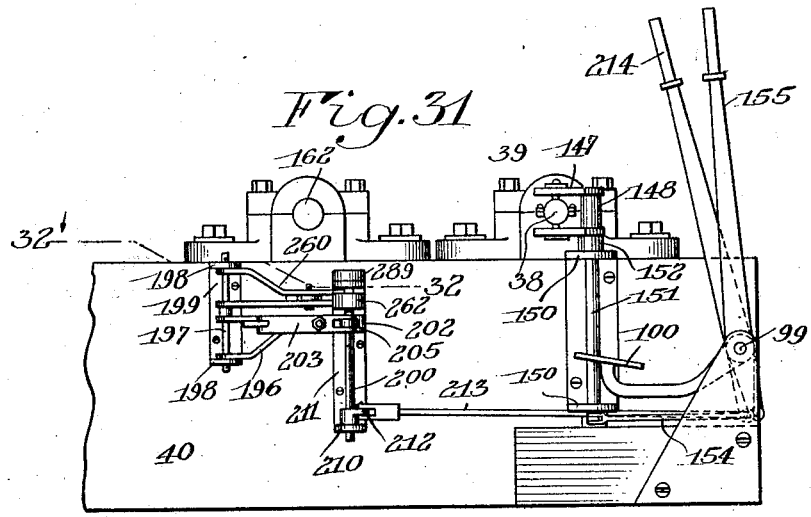
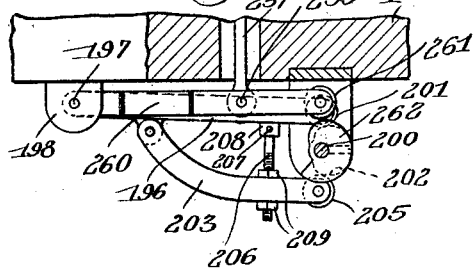
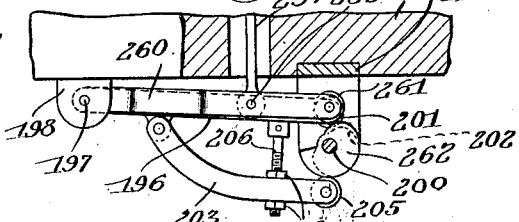
INVENTOR
Leo R. Heisler
BY
his ATTORNEYS Patented June 12, 1928.

1,673,509

UNITED STATES PATENT OFFICE.

LEO R. HEISLER, OF AKRON, OHIO.

POWER TRANSFER AND CONTROL DEVICE.

Application filed June 17, 1926. Serial No. 116,568.

This invention relates to power transfer and controlling mechanism, and more particularly to such mechanism that may be advantageously utilized in hoisting and excavating machines and shovels. Heretofore the source of power for such machines has commonly been of the steam operated type, because of the ease and flexibility with which it was controlled. The explosion engine was unsatisfactory because it provides a continually operating source of power, and the control and transfer of its power to the various parts of the excavating mechanism or shovel introduced difficulties which heretofore were never satisfactorily overcome. Furthermore, the explosion engine is somewhat uncertain in its operation. For example, it might choke and stop under load, and if stopped could not always be easily restarted while connected to the load, and the control of the bucket or excavating shovel while the engine was being restarted upon such a cessation of power was also a difficult problem.

An object of this invention is to improve the construction and control of power transfer and control mechanism, particularly of this type, and make it safer and more dependable in use; which will require the exercise of a minimum of physical force in its control; and which will be relatively simple and inexpensive.

A further object is to provide improved mechanism for controlling the operation of an element, such as a cable drum for hoisting and excavating machines, in both directions with a minimum of physical effort and with a maximum of certainty and safety; and which may be advantageously utilized with a continually operating source of power.

A further object is to provide improved brake, clutch and friction mechanism for machines of this and other types.

Various other objects and advantages will be apparent from the following description of an embodiment of the invention, and the novel features will be particularly pointed out hereinafter in connection with the appended claims.

In the accompanying drawing:

Fig. 4 is a sectional elevation of the friction mechanism of the same, with the section taken approximately along the line 4—4 of Fig. 1;

Fig. 5 is a sectional elevation through a portion of the mechanism of Fig. 4, for showing details of the friction operating means;

Fig. 6 is a sectional elevation similar to Fig. 4, but with the friction device active;

Fig. 7 is an elevation similar to Fig. 5 but with the parts in the relative positions occupied when the friction device is active; as shown in Fig. 6;

Fig. 8 is a sectional elevation through a portion of the machine for illustrating the construction of the main clutch and safety brake, the section being taken approximately along the line 8—8 of Fig. 1;

Fig. 9 is a transverse sectional elevation of a portion of the mechanism shown in Fig. 8, for illustrating certain details of construction;

Fig. 10 is a fragmentary sectional elevation of certain mechanism shown in Fig. 8;

Fig. 11 is a fragmentary sectional elevation of a portion of the mechanism of Fig. 8 with the parts in one operative relation;

Fig. 12 is a view similar to Fig. 11, except that the parts are in different operative relations;

Fig. 13 is a sectional elevation similar to Fig. 8 but with the parts in different operative relation to one another;

Fig. 14 is a transverse sectional elevation through the clutch mechanism shown in Fig. 13, the section being taken approximately along the line 14—14 of Fig. 13;

Fig. 15 is a plan of a portion of the clutch mechanism shown in Fig. 13;

Fig. 16 is a sectional view of the clutch mechanism, with the section taken approximately along the line 16—16 of Fig. 14;

Fig. 17 is a sectional elevation through the machine, illustrating the clutch mechanism and safety brake in side elevation;

Fig. 18 is an elevation of one of the details of the safety brake clutch;

Fig. 19 is a sectional elevation of the machine, with the section taken approximately along the line 19—19 of Fig. 1;

Fig. 20 is an elevation of part of the mechanism shown in Fig. 19, with the detailed parts in a different operative relation to one another;

Fig. 21 is an end elevation of the machine and illustrating in elevation the mechanism shown in Fig. 19;

Fig. 22 is a front elevation of a controlling cam of the friction mechanism;

Fig. 23 is a side elevation of the same;

Fig. 26 is a sectional elevation through a portion of the mechanism and illustrating details of the safety brake, the parts being shown in the operative relations assumed when the drum is being held by the safety brake.

Fig. 27 is a view similar to Fig. 26 but illustrating the relation of the various details when the safety brake is ineffective and power is being transferred to the cable drum;

Fig. 28 is a sectional elevation through a portion of the mechanism and illustrating details of the safety brake mechanism when the latter is free and no power is being transferred to the cable drum;

Fig. 29 is an elevation of a portion of the machine, and illustrating the controlling devices for the various operating parts;

Fig. 30 is a plan partly in section of a portion of the same and illustrating the controlling cams; the section being taken approximately along the line 30—30 of Fig. 29;

Fig. 31 is an elevation similar to Fig. 29 but illustrating the controlling devices in a different operative relation;

Fig. 32 is a plan partly in section of a portion of the same, with the section taken approximately along the line 32—32 of Fig. 31;

Fig. 33 is a side elevation of the safety brake clutch; and

Fig. 34 is a schematic elevation of an excavating machine with which a device constructed in accordance with this invention may be advantageously used.

Figure 1:
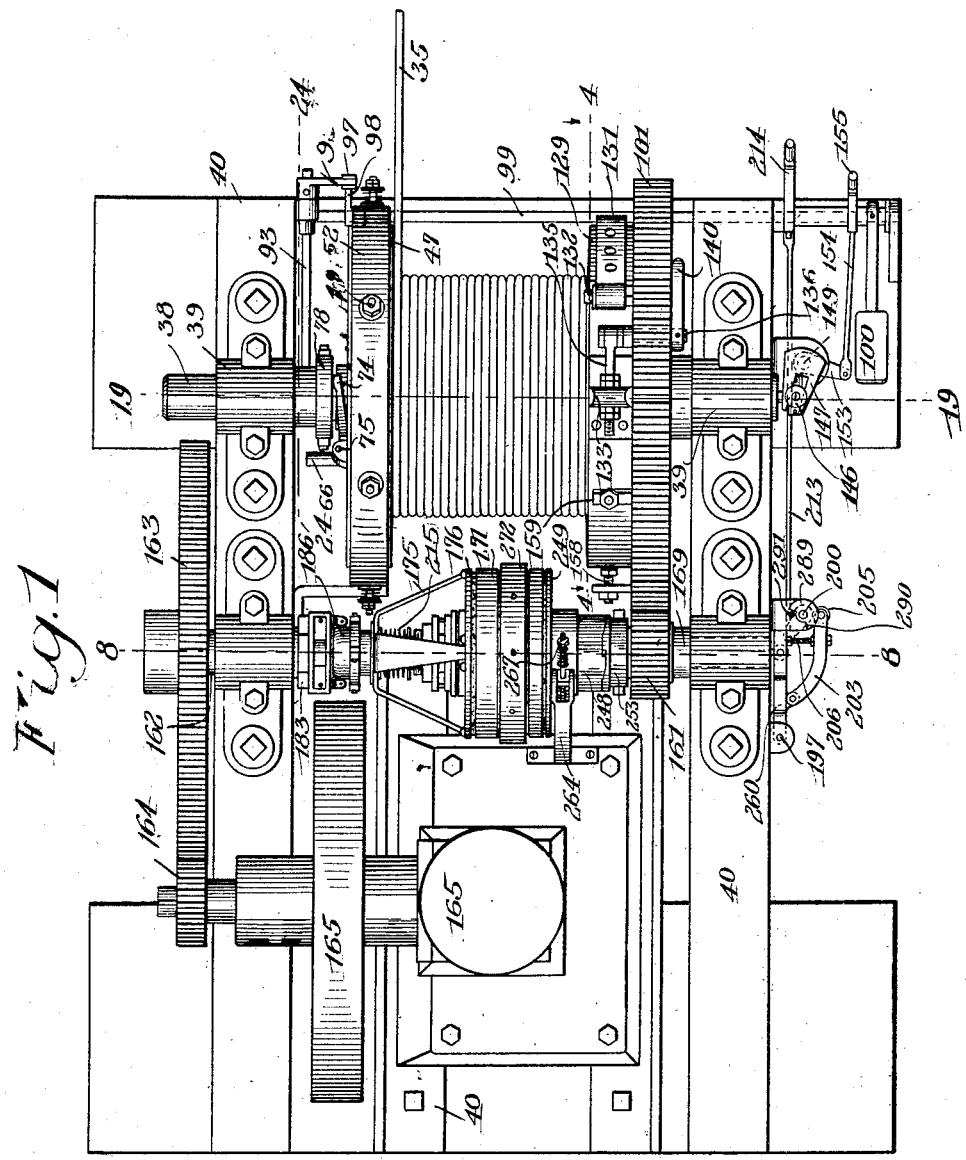
Fig. 1 is a plan of a cable drum and its control and operation by mechanism constructed in accordance with this invention.
Figure 2:
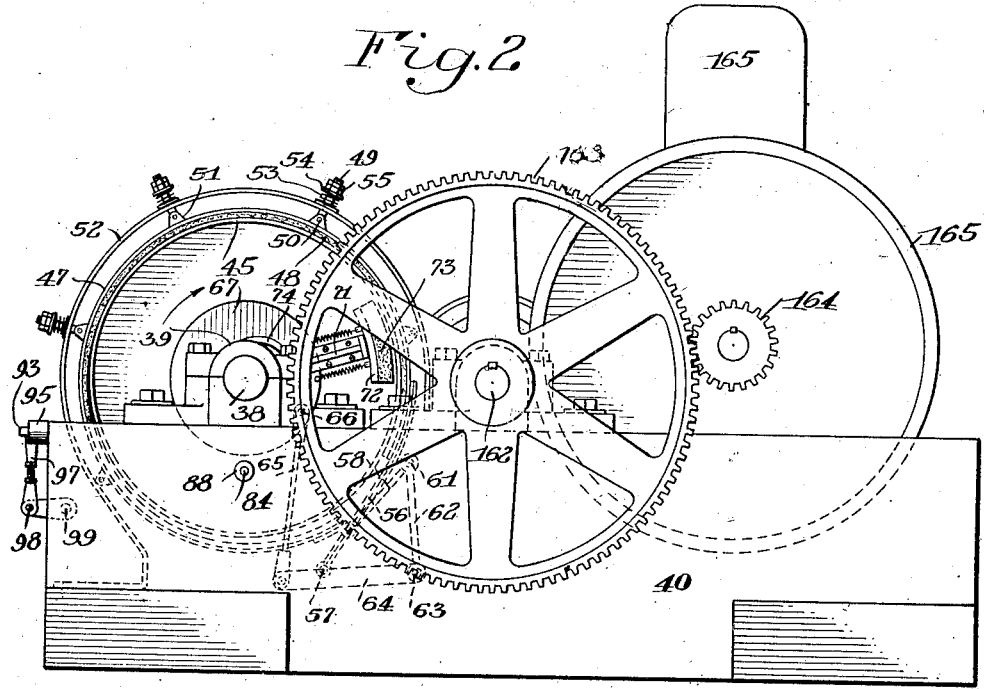
Fig. 2 is a side elevation of the same.

In the illustrated embodiment of the invention, a flexible operating cable 35 is wound upon a drum 36 (see Figs. 1 and 19), as usual in hoisting and excavating machines. This drum 36 may be spool-shaped and mounted by bushings 37 upon a shaft 38 which extends through the bushings and the core of the spool or drum. The bushings are preferably provided with flanged heads which fit against the outer end faces of the spool or drum 36 so as to confine the spool between them, and the bushings 37 are in turn confined within the core by the flanges. The shaft 38 is rotatably mounted in bearings 39 provided upon the base 40, and the spool is disposed upon a section of the shaft which extends between the bearings. The bushings 37 are confined within the core of the spool by split collars 41 and 42 which are fitted in annular grooves 43 and 44 respectively of the shaft.

Figure 24:
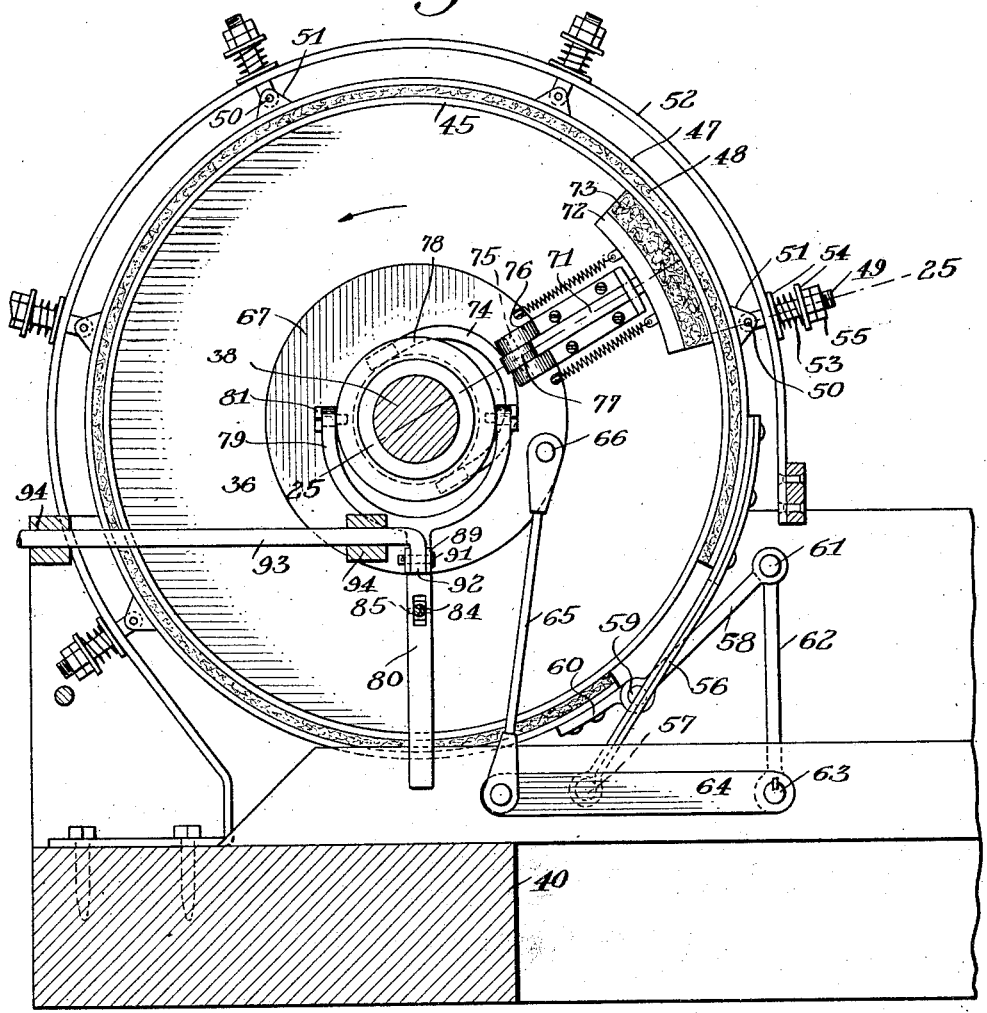
Fig. 24 is a sectional elevation through a portion of the mechanism and illustrating the service brake mechanism for the cable drum, the section being taken approximately along the line 24—24 of Fig. 1.
Figure 25:
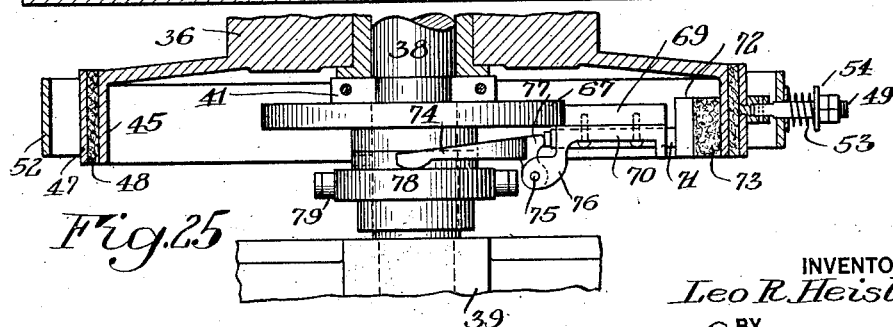
Fig. 25 is a sectional plan of a portion of the mechanism shown in Fig. 24.

The end walls of the spool or drum are provided with cylindrical flanges 45 and 46 concentric with the shaft 48, and which serve as brake drums. A brake band 47 (see Figs. 19, 24 and 25) surrounds the flange 45 for nearly its entire periphery, and is provided with a brake lining 48 which contacts with the outer face of the flange 45. Short rods 49 are connected by pins 50 to ears 51 extending from the outer face of the brake band 47, and extend through apertures in an arcuate plate or arch 52 which extends about the brake band for a considerable distance in a direction circumferentially of the flange 45 and is secured at its ends to the base 40. A helical compression spring 53 is confined between washers 54 mounted upon the outer projecting ends of the rods 49 and abutting against the outer face of the arch 52. Nuts 55 are threaded upon the outer ends of the rods 49 for variably compressing the springs 53 against the arch 52, in order that the yielding forces urging the brake band away from the drum may be varied.

A strap 56 (Fig. 24) connected to one end of the brake band 47 is pivotally connected by a pin 57 to a suitable part of the base 40. A link 58 is pivotally connected at one end by a pin 59 to the projecting end of a strap 60 which is in turn connected to the other end of the brake band. The other end of the link 58 is pivotally connected by a pin 61 to an arm 62 which is fixed on a shaft 63. An arm 64 is also keyed or fixed upon the shaft 63 and is connected by a link 65 to a pin 66 projecting from a member 67, which is rotatably mounted upon the shaft 38 and confined against endwise movement by the split collar 41 (Fig. 19) and a ring 68 that is secured in any suitable manner such as by a set screw to the shaft. The member 67 is disposed within the flange 45, and is provided with a radially extending arm 69 which carries a guide 70 for a plunger 71.

The plunger 71 is mounted for reciprocation in the guide 70, and at its outer end carries a head 72 provided with a friction pad 73 for contact with the inner face of the flange 45. A lever 74 is hinged at 75 between ears 76 projecting from the inner end of the guide 70.

The lever 74 extends toward the shaft 38 and is provided with a tail portion 77 which abuts against the inner end of the plunger 71, so that when rocked in one direction to a slight extent, it will force the plunger 71 outwardly and in a manner to force its head pad 73 against the inner face of the flange 45. The lever 74, at its free end, is forked so as to embrace the shaft 38.

The arms of the fork of the lever 74 abut against one end face of a ring 78 which is slidable and rotatable upon the shaft 38. The ring 78 is in turn embraced by the arms 79 of the forked end of a lever 80, the ring being pivoted between the arms 79 by pins or trunnions 81. The end of the lever 80 opposite from the fork is provided with a slot 82, extending from the end inwardly for some distance, which fits over a rocker nose 83 provided upon the base 40. The nose 83 thus serves as a fulcrum for the lever 80 and at the same time permits of a limited endwise movement of the lever 80 which is required by reason of the pivotal connection of the lever 80 to the ring 78. Thus when the lever 80 is rocked towards the drum or spool it will shift the ring 78 in the same direction, and the latter will in turn rock the lever 74 and force the head 72 against the flange 45.

When the head 72 engages the flange 45 of the drum it will cause a frictional coupling of the member 67 to the drum for movement therewith, and the latter through the link 65, arm 64, shaft 63, arm 62, and link 58 will cause a tightening of the brake band upon the outer face of the flange 45 in order to check rotation of the drum. The lever 80 is normally held retracted however by a rod 84 which is pivoted to the lever at 85 and extends through a passage 86 in one of the bearings 39 of the base 40. A helical compression spring 87 is disposed in the passage 86 of the bearing 39, and is compressed against a shoulder in the passage by a nut 88 which is threaded upon the free end of the rod 84. The spring 87 thus yieldingly retracts the lever 80, and the force of such retraction may be varied by adjustment of the nut 88.

A pair of links 89 (Figs. 19 and 24) are pivoted by a pin 90 to opposite faces of the lever 80, extend toward the bearing 39, and are pivoted by a pin 91 to the angular or crank end 92 of a crank rod 93 (see also Fig. 21) which is rotatably mounted in bearings 94 provided upon suitable extensions of the base 40. The crank rod 93 (see Fig. 21) at its outer end carries an arm 95 which is connected by a pivot pin 96 to one end of a link 97. The link 97 is in turn provided at its free end with a fork which embraces and is pivotally connected to an arm 98 projecting from the shaft 99. The shaft 99 extends between and is rotatably supported by suitable extensions of the base 40 and upon one end carries a foot lever or pedal 100 (see also Figs. 1, 3, 29 and 31). Thus by depression of the pedal 100, the crank rod 93 may be operated to force the lever 80 toward the end of the spool in order to cause an operation of the brake band 47 upon the drum.

The shaft 38 is rotated by means of a gear 101 (see Fig. 19) which is fixed to the shaft in any suitable manner such as by a set screw 102. This shaft 38, at a point between the gear 101 and the end of the spool or drum having the flange 46, is provided with a slot 103 which extends radially through the shaft and which is elongated in a direction lengthwise of the shaft. The shaft 38 is also provided with an axial passage 104 extending in both directions from the aperture 103, the passage section which extends toward the end of the shaft extending entirely to the end. In the passage 104 a rod 105 is mounted for reciprocation and carries a pin 106 which extends, at both ends, out of the aperture or slot 103. When the rod 105 reciprocates, the pin 106 will be reciprocated in the slot 103 in a direction endwise of the shaft 38. A cam ring 107 (see Figs. 22 and 23) is rotatably and slidably mounted on the shaft 38 over the slot 103 and is provided with an internal annular groove 108 (see Fig. 23) which receives shoes 109 carried by the projecting ends of the pin 106. Thus the cam ring 107 will be reciprocated endwise of the shaft 38 upon reciprocation of the rod 105.

A member 110 (see Figs. 4 and 6) is rotatably mounted upon the shaft 38 and surrounding the cam ring 107, the member 110 being formed of two spaced rings or flanges 111 (see also Figs. 19 and 20) which are connected by cross pieces 112 (see Figs. 5 and 7), the latter fitting against flat edges 113 of the cam ring 107 so as to prevent rotation of the ring 107 independently of the member 110. The member 110 is provided with arms 114 (Figs. 4 and 6) extending radially and outwardly from the shaft at a point between the gear 101 and the end face of the drum or spool 36. The arms 114 terminate within the limits of the flange 46, and arms or levers 115 are pivoted by pins 116 to the outer ends of the arms 114. The arms 115 carry friction pads 117 which engage with the inner surface of the flange 46 when the arms 115 swing outwardly. Control arms 118 are pivoted by pins 119 to the arms 114.

A pivot piece 120 is pivoted by a pin 121 to each arm 118 and a pivot piece 122 is similarly connected by a pivot pin 123 to each arm 115. A stem 124 is threaded into one of the pivot pieces, such as 122, so as to be adjustable into and out of the same to various extents, and a lock nut 125 on the stem secures it in adjusted positions. The other end of the stem is slidably and rotatably received in a socket in the other piece, which in this example would be 120. A spring 126 is connected between each arm 115 and an eye 127 extending from the pin 119 of the adjacent arm 118, so as to normally urge the arm 115 out of contact with the flange 46 and in a direction to hold the stem 124 in the socket in the pivot piece 120.

The arms 118 at their free ends carry rollers 128 (Figs. 5 and 7) in a position to roll across the cam ring 107. Thus when the cam ring is shifted in a direction endwise of the shaft 38 it will engage the rollers 128 and force the arms 118 outwardly, or will release them for movement toward the shaft under the action of the springs 126. When the arms 118 are forced outwardly, they will of course force the pads 117 into contact with the flange 46 and thus frictionally couple the arms 114 to the flange.

A clutch band 129 (Figs. 4 and 6) surrounds the flange 46 and carries a friction lining 130 which engages with the outer face of the flange 46. One end of the band 129 is connected by a strap 131 to a pivot pin 132 projecting from the adjacent face of the gear 101. The other end of the band 129, which lies adjacent to but spaced from the first mentioned end of the band, is provided with a lug 133 having an aperture 134 which slidably and tiltably receives a threaded rod 135 which is pivoted at 136 to an arm 137 of a short shaft pin 138. The rod 135 is threaded at the end passing through the lug 123 and carries abutment nuts 139 engageable with both faces of the lug. The stub shaft or pin 138 is rotatably mounted in the gear 101 and also carries an arm 140. The free end of this arm is articulately connected by a link 141 to one of the arms 114.

Thus when the member 110 is coupled to the flange of the spool by the arms 115 the relative movement occurring between the shaft 38 and the spool will cause a limited rotary movement of the member 110 upon the shaft 38, in a manner to pull the arm 140 in a direction to draw the ends of the brake band toward one another and tighten the friction lining 130 upon the flange 46 of the cable drum or spool. Inasmuch as the band is carried by the gear 101 it will couple the gear directly to the cable drum or spool, frictionally, and thus effect a driving connection between them. Any slippage between the gear and cable drum will thus cause automatically a more intense pressure of the clutch band upon the flange 46, and thus a more effective coupling of the gear and cable drum. Since the contact of the arms 115 with the flange 46 is under the control of the cam ring 107, it will be obvious that the shifting of the cam ring in a direction endwise of the shaft 138 will effect the coupling or uncoupling of the gear 101 and the cable drum.

The rod 105 by which the cam ring 107 is shifted projects outwardly beyond the edge of the shaft 38, as shown particularly in Figs. 19 and 20, and carries a pair of spaced flanges 142. A ring 143 is rotatably confined on the rod 105 between the flanges 142, and rollers 144 are confined against diametrically spaced points of the outer surface of the ring 143 by screws 145 and washers 146. The rollers 144 are embraced by the forked ends of arms 147 (see also Figs. 1, 3, 29 and 31) of a member 148 which is fixed upon a vertically extending shaft 149. The shaft 149 is rotatably mounted in ears 150 of a U-shaped bearing element 151 that is secured to the base 40. A bushing 152 may be disposed between the member 148 and one of the bearing ears 150. The lower end of the shaft 149 is provided with an arm 153 (see Fig. 1) which is connected by a link 154 to the depending tail or end of a control lever 155. The control lever 155 is pivotally mounted upon the shaft 99 which carries the control pedal 100 (see Fig. 21). Thus operation of the control lever 155 will cause a coupling or uncoupling of the gear 101 and the cable drum or spool.

The connection between the link 141 and one of the arms 114 includes a pin 156 which projects from the arm 114 between the spokes of the gear wheel, so as to provide a connection between the arms 114 which are located on one face of the gear wheel and the link 141 and the arm 140 which are located at the other face of the gear wheel. The lost motion of the pin 156 in the space between two adjacent spokes of the gear wheel 101 enables the relatively small travel of the arms 114 in effecting a frictional coupling between the gear wheel and the cable drum.

It is desirable that the pin 156 be held normally at one limit of its movement which will provide for the maximum lost motion required in effecting a coupling of the gear wheel and cable drum, and therefore, a spring 157 may be connected between one of the arms 114 and a spoke of the gear wheel, as shown in Figs. 4 and 6 particularly, so as to rock the member 110 and its arms 114 yieldingly in a direction to place the pin 156 at the desired initial position shown in Fig. 4. It is also desirable to limit the outward movement of the clutch band 129 when it is released, and for that purpose a plurality of screws 158 may be threaded radially of the gear wheel through ears or brackets 159 carried by the gear wheel. The heads of the screws are preferably innermost, as shown in Figs. 4 to 6, for contact with the clutch band, and the screws may be held in adjusted positions by lock nuts 160. By adjusting the screws 158 outwardly, the band 159 will be given a greater freedom of movement when released.

Referring now particularly to Fig. 1, the gear wheel 101 meshes with and is driven by a pinion 161, and the latter is driven through suitable clutch mechanism, to be described presently, from a shaft 162 (see Fig. 8) which in turn carries a gear 163 (see Fig. 1). The gear 163 meshes with and is driven by a pinion 164 carried by the main drive shaft of a suitable source of power such as an explosion engine 165.

Referring particularly to Figs. 1 and 8 to 18, the clutch mechanism just referred to will now be described. The pinion 161 is secured, such as by keys 166, upon the reduced end of a sleeve 167 which surrounds the shaft 162. Bushings 168 are provided upon the shaft 162, extend into the bore of the sleeve 167 from opposite ends, and rotatably mount the same upon the shaft. The outer ends of bushings 168 are flanged outwardly so as to fit against end faces of the sleeve 167 and confine the sleeve between them. The flange of one of the bushings which engages with the reduced end of the sleeve carrying the pinion 161 also overlies the outer end of the keys 166, and if desired also slightly one end face of the pinion 161, so as to confine the keys 166 and the pinion 156 to the sleeve.

Collars 169 and 170 are secured in any suitable manner, such as by set screws to the shaft 162 at the ends of the sleeve 167, so as to engage with the end faces of the bushings 168 and prevent their separation and thus prevent endwise displacement of the sleeve 167 upon the shaft, while allowing free rotation of the sleeve 167 with the pinion 161. The end of the sleeve 167 which is furthest from the pinion 161 is flanged outwardly and then parallel with the axis of the shaft 162 so as to provide a cylindrical flange section 171 which is concentric with the shaft 162. The opposite end edges of this cylindrical flange 171 of the sleeve 167 are provided with channels or grooves 172 and 173 extending concentrically about the shaft 162 and with the side walls of each groove 172 and 173 convergent toward the bottom for purposes to appear shortly.

Another sleeve 174 is rotatably mounted upon the shaft 162, and is provided with diverging arms 175 that are connected at their outer ends by a ring 176 so as to form a spider ring and this ring 176 carries arcuate strips 177 of friction material that are disposed in a row concentrically about the shaft 162 and tapered for wedging engagement with the channel or groove 172 in the adjacent end edge of the flange 171 of the sleeve 167. The sleeve 174 which carries the spider is also slidable endwise of the shaft 162 so as to shift the friction strips 177 into and out of the channel or groove 172.

A ring 178 is mounted upon the end of the sleeve 174 which is furthest from the spider ring, and is provided with radially extending slots 179, in which levers 180 are disposed and pivotally mounted upon pins 181. One arm of each lever 180 extends somewhat radially of the shaft 162 and enters a slot 182 in the end of the sleeve 174, so that when the levers 180 are locked in one direction the sleeve 174 will be cammed endwise and away from the ring 178. The ring 178 is shiftable endwise of the sleeve 174, and abuts against one end face of a nut 183 which is threaded upon a collar 184 that may be secured upon the shaft 162 by a set screw 185. The nut 183 serves as an adjustable abutment for the ring 178. The other arms of the levers 180 extend along the sleeve 174 in a position to be engaged by the end or nose of a sleeve 186 which is slidably and rotatably mounted upon the outer surface of the sleeve 174.

When the sleeve 186 is shifted endwise toward the ring 178, its cam nose or end will engage with the adjacent arms of the levers 180 and force them outwardly so as to rock the other arms of those levers and force the sleeve 174 endwise in a direction to carry its spider ring 176 into frictional driving relation with the sleeve 167. To facilitate the cam action between the sleeve 186 and the lever 180, the latter may carry rollers 187 upon the free ends of the arms which are engaged by the sleeve 186, and the surfaces of the other arms of the levers 180 which contact with the sleeve 174 are preferably made convex so as to have a more or less rocking contact with the inner end walls of the slots 182.

The sleeve 186 is provided with an annular rib 188 which is rotatably received in an internal annular groove in a split ring 189 surrounding it, so that the sleeve 186 will be rotatable independently of the ring 189 but coupled to it for movement therewith endwise of the shaft 162.

Referring now particularly to Fig. 17, the ring 189 is embraced by the forked end of a lever 190 which depends below the shaft 162 and is pivotally mounted as at 191 upon a suitable section of the base 40. The arms of the forked lever 190 are connected by pivot pins or trunnions 192 to the split ring 189, so that when the lever 190 is rocked it will shift the sleeve 186 endwise, and through the levers 180 and the ring 178 cause an endwise movement of the sleeve 174. A link 193 at one end is connected by pivot pin 194 to the lever 190, and at its other end is connected by a pin 195 to a lever 196 (see also Fig. 3) which is in turn pivoted upon a pintle 197. The pintle 197 extends between the ears 198 of a U-shaped bracket 199 which is secured to the base 40 in any suitable manner. Referring particularly to Fig. 17, the link 119 may be formed of two or more telescopic sections threaded together so as to be adjustable in length.

Referring now particularly to Figs. 17 and 29 to 32, the arm 196 extends adjacent to a spindle 200, and carries a roller 201 which engages with a cam 202 (shown by dotted lines in Figs. 30 and 32) which is fixed to the spindle 200. A second arm 203 is hinged at 204 to the arm 196 and extends along the side of the spindle 200 opposite from the arm 196. A roller 205 is provided upon the free end of the arm 203 for contact with the surface of the cam 202 at a point approximately opposite from the roller 201.

A rod 206 (Fig. 30) is connected by a pivot pin 207 to an ear 208 projecting from the arm 196, and extends through an aperture in the arm 203. The rod 206 is threaded for some distance from the free end, and carries adjusting nuts 209 which engage with opposite faces of the arm 203, so that by adjustment of the nuts 209 the distance between the free ends of the arms 196 and 203 may be varied. This adjustment is utilized in order to hold both cam rollers 201 and 205 in contact with the cam 202. The spindle 200 is rotatably mounted in arms 210 of a U-shaped bracket member 211 which is also secured to the base 40. An arm 212 is fixed to the spindle 200, and its free end is pivotally connected to one end of a link 213, the other end of the latter being connected to the depending end of an operating or control lever 214 which is also oscillatably mounted upon the shaft 99.

Thus by operation of the lever 214, the cam 202 may be oscillated to cause a rocking of the arms 196 and 203 as a rigid unit positively in both directions. By reason of the link 193, the lever 190 will be rocked and the latter will in turn shift the sleeve 186. The sleeve 186 through the levers 180 and the ring 178, will shift the spider sleeve 177 into frictional clutching engagement with the cylindrical flange 171 which carries the pinion 161. The sleeve 174 is yieldingly urged in a direction out of frictional engagement with the sleeve 167 by a helical compression spring 215 (see Fig. 8) which is compressed between a washer 216 provided upon the shaft 162 and abutting an end face of the sleeve 174, and a collar 217 which is secured to the shaft 162 in any suitable manner such as by a set screw.

Referring now particularly to Figs. 8 to 16, a sleeve 218 having a flanged head 219 at one end, is mounted upon the shaft 162 within the spider ring 176 and the cylindrical flange 171 and is connected by keys 220 to the shaft for rotation therewith. The keys 220 are confined against endwise movement in the shaft 162 and engage in slots 221 in the sleeve 218, so that the latter may slide in a direction endwise of the shaft 162. A plate or disc 222 is slidingly mounted on the sleeve 218 and keyed thereto by suitable keys 223 (see Fig. 15), so as to be capable of sliding motion along the sleeve 218 but rotatable therewith. Thus the flanged head 219 and the plate 222 will always rotate together and with the shaft 162, but will be shiftable toward and from one another.

A ring 224 is secured to the inner periphery of the flange 171 by pins 225 which are received in radially extending sockets 226 in the outer peripheral wall of the ring 224. The pins 225 are provided with threaded heads which are threaded through a cylindrical flange for support therefrom. The plate 224 is provided with a plurality of apertures 227 (see Figs. 14 and 16) elongated arcuately about the shaft 162. Arcuate strips 228 of friction material or friction pads are disposed in the apertures 227, being secured therein frictionally as shown particularly in Figs. 14 and 16. The plate 224 is disposed between the flanged head 219 of the sleeve 218 and the plate 222, so that when the latter have their relative movement toward one another they will engage with opposite faces of the arcuate pads 228, the slots 221 for the keys 220 permitting movement of the sleeve 218 endwise sufficiently to insure equal contact of the head 219 and the plate 222 with the arcuate friction pads.

Within the ring 224 another ring 229 is disposed in a manner to fit closely upon the sleeve 218, and this ring 229 may be secured to the keys 220 by screws 230, which are threaded into and through the ring 229 and have reduced ends engaging in sockets provided in the outer edge surface of keys 220 (see Figs. 13 and 14). This ring 229 is also keyed to the sleeve 218 by the keys 223. The ring 229 is provided with arcuate fins 231 projecting from its outer surface and within the space encompassed by the ring 224, the ends of the fins being spaced apart sufficiently to permit of access to the screws 230. The fins also connect the sections of the ring which are cut by the keys 223, as shown particularly in Fig. 14.

Pins 232 are secured in the fins 231 so as to project from opposite faces thereof and receive over them the ends of helical compression springs 233. The springs 233 abut against the head 219 and the plate 22, so as to urge them apart yieldingly, and away from the ring 224 and its friction pads 228. The faces of the plate 222 and the head 219, against which the springs 233 abut, may be provided with recesses 234 (Fig. 16) for receiving the ends of the springs and thus preventing their displacement.

A pair of discs 235 and 236 (Fig. 13) may be secured together face to face and rotatably and slidably mounted upon the sleeve 218, one of the discs such as 236, having an arm 237 extending outwardly therefrom and provided with an aperture 238 which receives a pin 239 projecting from one of the arms 175 of the spider sleeve 174. The plates 235 and 236 will thus rotate with the spider arms and will be free to slide upon the sleeve 218. A plate or disc 240 is fitted against one face of a nut 241 which is threaded upon the unflanged end of the sleeve 218, and a tongue 240ᵃ (Fig. 15) of the plate 240 acts as a key running in a key way 240ᵇ of the sleeve 218. The plates 236 and 240 which face one another are interconnected by a series of dumb-bell links 242 the ends of which are received in cavities in the abutting faces of the two plates, as shown particularly in Figs. 11 and 12.

When the plates thus connected are rotated relatively to one another the links 243 will force them apart as will be evident from an inspection of Figs. 11 and 12, the latter figure showing the plates separated as a result of such rotation. A lug 244 (see Figs. 9 and 10) projecting from one of the abutting faces of one of the plates, such as from the plate 240, cooperates with spaced abutments 245 projecting from the opposing face of the plate 236 to limit the relative movement between the plates 236 and 240 to approximately the length shown in Figs. 11 and 12.

A plate 246 is rotatably and slidably mounted upon the sleeve 218 between the plates 235 and 222, and is provided with a plurality of apertures from face to face in which balls or bearings 247 are rotatably confined. The balls 247 serve as an antifriction thrust connection between the plate 222 and the nut 241 on the sleeve 218. Thus by means of the ball bearing thrust connection, the force required to rotate the plates 235 and 236, even under pressure, will be a minimum.

With this clutch mechanism just described let it be assumed that the shaft 162 is continuously rotated in one direction, and that the pinion 161 and the sleeve 167 are idle or relatively stationary, such as because of their connection to the cable drum to which the load is connected. The spring 215 will hold the sleeve 174 yieldingly away from the flange 171, it being assumed of course, that the clutch control lever 124 is in a position where the cam 202 holds the sleeve 186 in a position to release the lever 180. The spider sleeve 174 will be forced against the abutment nut 183, which rotates with the shaft, by reason of the spring 215 which also holds the spider sleeve away from frictional engagement with the cylindrical flange 171.

The spider sleeve 174 and its arms will thus rotate with the shaft, carrying the plate 237 therewith by reason of the action of the pin 239. The plate 240 however is also rotating with the shaft by reason of the connection to the sleeve 218 that is also keyed to the shaft, and therefore there will be no relative movement between the plates 236 and 240, the plates being shown in such relative positions in Fig. 11 in which they are as close together face to face as possible. At this time the plate 222 and head 219 will be separated from the arcuate pads 228 which are connected to the sleeve 167.

If now the clutch control lever 214 is shifted in a manner to rock the lever 190 and shift the cam sleeve 186 in a direction to force the rollers of the lever 180 apart, the spider sleeve will be shifted endwise into frictionally coupled engagement with the cylindrical flange 171 of the sleeve 161 which carries the pinion 166. Since the sleeve 167 is relatively idle or stationary at this time it will retard the spider sleeve, which is only frictionally driven, and this will cause a retardation of the plate 236. However since the plate 240 continues to rotate with the shaft 162, a relative movement between these plates will occur, with the result that they will be forced apart by the dumbbell links. This separation of the plates 236 and 240 will force the ball bearings 247 in a direction to force the plate 222 and the flange or head 219 toward one another. The shaft 162 and the sleeve 167 will thus be frictionally coupled together by the pads 228, and held frictionally coupled by the dumbbell links 243.

The power from the engine will then be transferred through the clutch to the sleeve 167 and through the pinion 161 to the friction device (Fig. 4) which in turn couples the power to the cable drum. When the clutch control lever 214 is operated to shift the cam sleeve 186 in a reverse direction and release the spider sleeve 174, the spring 215 will disconnect the spider sleeve from the sleeve 167. The springs 233 will separate the plate 222 and the head or flange 219 from the friction pads, so as to stop the driving action between the shaft and the pinion 156. This action of springs 233 will also force the plates 236 and 240 toward one another as soon as the spider sleeve friction strips 177 become disengaged from the cylindrical flange 171.

Since the source of power in the present instance is an explosion engine, which may at times stall under heavy loads, some provision is desirable for preventing reverse movement of the cable drum, automatically in case for any reason the power source should stop or the operator should not quickly apply the brake to the drum by the foot pedal 100. Accordingly I have provided safety brake mechanism for the sleeve 167 which will now be described, it being understood that this safety brake mechanism may be set to become immediately and automatically active upon reverse movement of the cable drum.

Referring now particularly to Figs. 1, 18 and 26 to 33, a sleeve 248 is rotatably and slidably mounted upon the sleeve 167, and at the end adjacent the cylindrical flange 171 is provided with a peripheral flange 249 which carries arcuate friction strips 250 for engagement in the channel or groove 173 of the cylindrical flange 171 when the sleeve 248 is shifted endwise upon the sleeve 167. The end of the sleeve 248, which is opposite from the flange 249, is provided with cam teeth 251 which are somewhat in the nature of ratchet teeth and which cooperate with somewhat similar but oppositely disposed cam teeth 242 provided upon the abutting face of another sleeve 253 which is also slidable and rotatable upon the sleeve 167. The sleeve 253 is connected by pins 254 (see Fig. 17) to the forked end of a lever 255 which is pivoted at 256 to a suitable portion of the base 40.

An extensible link 257, similar to the link 193, is pivotally connected at one end by a pin 258 to the lever 255, and at its other end by a pin 259 to a lever 260 which is also rotatably mounted upon the spindle 197. The lever 260 extends adjacent to the spindle 200, and carries a cam roller 261 for contact with a cam 262 which is also fixed upon the spindle 200. A spring 263 (see Fig. 17) is connected between the lever 255 and the base 40 for yieldingly urging the lever 255 in a direction to shift the sleeve 253 away from the sleeve 248, and to hold the cam roller 261 against the cam surface of the cam 262. Thus by operation of the clutch control lever 214 the position of the cam sleeve 253 will be varied. In Fig. 33 the sleeve 253 is illustrated as in its extreme inactive position and in Fig. 17 it is illustrated as in effective position.

Referring now particularly to Figs. 1 and 26 to 28, a bracket arm 264 extends from the base 40 above the sleeve 248 and at its forward free end is forked so as to embrace a block 265 which is disposed and pivoted between the arms of the forked end by trunnions 266. A rod 267 passes through the block 265 in a direction transversely to the axis of the trunnions 266, and is slidable endwise through the block 265. At one end, the rod 267 is provided with a bracket piece 268 which is connected by a pivot pin 269 to the flange 249 of the sleeve 248. Adjustable abutments, such as nuts 270, are provided upon the rod 267 at its free end and also adjacent the bracket piece 268. Helical compression springs 271 are confined upon the rod 267 between these adjustable abutments or nuts 270 and the block 265. The springs 271 serve to hold the rod 267 yieldingly part way through the block 265 as shown in Fig. 28.

A brake band 272 having a friction lining 273 (see Fig. 8) surrounds the cylindrical flange 171, and may engage in a groove 274 in the outer face of the flange 171. One end of the band 272 is anchored over a pin 275 carried by a bracket 276 on the base 40, and the other end of the band is connected to a threaded rod 277 which passes through an aperture in the intersecting section of the band and also freely through a block 278. The block 278 is mounted by trunnions 279 in an arm 280 which is fixed upon a pin or shaft 281, and the latter is in turn rotatably mounted in bearing ears 282 of a bracket 283 which is also mounted upon the base 40. An arm 284 is also fixed upon the shaft 281 and extends along a face of the flange 249.

The free end of the arm 284 is connected by a pivot pin 285 to one end of a link 286, the latter being pivotally connected at its other end by a pin 287 to the flange 249. When the flange 249 rotates with the sleeve 167, owing to the engagement of the friction strips 255 in the channel 173, the arm 284 will be rocked in a manner to tighten the brake band, and during movement of the flange 249 one of the springs 271 will be compressed. Figs. 26 and 27 show two different operative positions of the parts, in which one or the other of the yieldable springs 271 will be compressed. The brake band 272 may have an aperture 288 adjacent its anchored end, through which the rod 277 may pass as shown particularly in Fig. 17. An abutment nut 289 may be threaded upon the free end of the rod 277 for engagement with the block 278, so that the initial tightness of the brake band may be varied to some extent.

In the operation of the safety brake mechanism which has just been described, let it be assumed that the clutch lever 214 is in the position shown in Fig. 31, under which condition the cams 202 and 262 will be in the relative positions shown in Fig. 32. Under the same conditions the lever 260 will be riding upon the low part of the cam 262, and the spring 263 will have shifted the sleeve 253 as closely as possible to the pinion 161 which will be the position shown in Fig. 33. At this time there will be considerable space between the cam teeth of the sleeves 253 and 248, and the latter sleeve will be free to move also toward the pinion 161 and out of coupled engagement with the sleeve 167. The springs 271 will hold the sleeve 248 in a neutral angular position, as shown in Fig. 28, with the brake band 272 loosened.

In this position of the lever 214, the clutch also will be disengaged, and the engine or source of power 165 may continue to operate independently of the cable drum. The cable drum will then be solely under the control of the friction device which couples the gear 101 to the drum, and under the manual control of the brake on the drum which is manipulated by the foot pedal 100. The safety brake will thus have no control over the cable drum.

Let it now be assumed that the control lever 214 is shifted from the position shown in Fig. 31 to the position shown in Fig. 29. During such movement the cams 202 and 262 will be shifted, and this movement of the cams will force the lever 260 in a direction to shift the sleeve 253 against the end of the sleeve 248 and force the friction strips 250 into the channel 173 as shown in Figs. 8 and 17, although the strips 250 are at this time not tightly engaged in the channel 173. Under such conditions the clutch mechanism, which is also controlled by the lever 214, will be still disconnected so that the source of power will have no effect upon the pinion 161 or the cable drum.

If the lever 155 is in the position shown in Fig. 31, the cable drum will be disconnected from the gear 101 and therefore there will be no connection between the cable drum and the safety brake with the result that the safety brake will continue to be ineffective or inactive. Under such conditions the cable drum is under the control of the manually initiated power operated brake which is controlled by the pedal 100, and hence the unwinding of the cable will be controlled by the pedal 100 exclusively.

If however, the lever 155 is shifted into the position shown in Fig. 29, the gear 101 will be frictionally coupled to the cable drum, and as the cable drum operates for the unwinding of the cable the pinion 161 and the sleeve 167 will be rotated in a direction reverse to their usual movement when the cable was wound up by the action of the source of power thereon. The direction of travel of the gear 101 and pinion 161 will then be as indicated by the arrows A and B in Fig. 27. At the beginning of this movement, which occurs when the cable is paid out, the engagement of the strips 250 in the channel 173 will cause a movement of the sleeve 248.

Inasmuch as the sleeve 253 will be held against rotation by the lever 255, the cooperating ratchet cam teeth 251 and 252 (see Figs. 17 and 33) will act upon one another to force the sleeve 248 toward the cylindrical flange 171. At this time the sleeve 253 will be held against endwise movement toward the pinion 161 by reason of the direct contact of the cam roller 261 of the lever 260 with the cam 262. This movement of the sleeve 248 upon the sleeve 167 therefore more tightly wedges the strips 250 into the channel 173 and more firmly couples the sleeves 167 and 248 frictionally. Their movement together causes a movement of the arm 284 from the position shown in Fig. 26 to the position shown in Fig. 27, with the result that the brake band 272 will be tightened upon the cylindrical flange 171. This checks rotation of the sleeve 167, and through the pinion 161 and the gear 101 the movement of the cable drum will be checked. The greater the movement of the cable drum after the brake is applied, the more firmly will the brake be applied, and this application of the brake will occur automatically at the very start of the unwinding movement of the drum without attention by the operator.

When one desires to release the safety brake, the lever 214 must either be operated into the position shown in Fig. 31, or the friction control lever 155 must be operated into the position shown in Fig. 31 for uncoupling the cable drum from the gear 101, whereupon that spring 271 which was previously compressed will become active and rotate the sleeve 248 reversely in a direction to carry its cam teeth into the positions shown in Fig. 17 while the safety brake is released. When the clutch mechanism is effective to couple the source of power to the pinion 161, the gear 101 and pinion 161 will rotate in directions shown by arrows B and C in Fig. 26, and during such rotation the frictional drag between the sleeves 167 and 248 may rotate the latter slightly so as to compress one of the springs 271, at which time the parts will be in the position shown in Fig. 26 with the safety brake completely released.

In order to limit the extent of movement of the lever 214, the spindle 200 may be provided upon its upper end with a disc 289 (see Figs. 1, 29 and 31) and this disc is provided with a cut away edge section or notch 290 (see Fig. 1). A pin 291 is provided upon the upper ear 210 of the bracket 211 within the notch 290, so that the engagement of the end walls of the notch with the pin 291 will limit the angular rotation of the spindle 200. This extent of movement is between the position of the lever 214 shown in Fig. 31 and the position of the same lever in Fig. 3.

In Fig. 34 I have illustrated the application of a cable drum to one form of excavating machine. In this example, the drum 36 for the cable 35 may be driven and controlled by the mechanism hereinbefore described, and another drum 292 is similarly operated and controlled either by the same source of power or a different one. A cable 293 is wound upon the drum 292 and connected at its free end to the forward end of the scraper bucket 294. The cable 35 passes over a pulley 295, provided at the free end of a boom 296, and connects to a central part of the bucket 294. An auxiliary cable 297 is connected at a point 298 to the cable 293, passes over a pulley 200 which is secured at 300 to the cable 35, and then is connected to the forward upper end of the bucket 294.

By such cables the bucket 294 may be dragged along to scrape up a load of dirt, elevated, and then subsequently dumped, merely by the selective operation of the cables 35 and 293. This selective operation of the cables in this manner is well known in the art, and therefore will not be further described herein. The operation of one of the cables such as 35 however will be summarized in order that the use of the various features of this invention may be understood.

Assuming that the explosion engine is operating continuously and that the control levers 155, 214 and pedal 190 are in the positions shown in Fig. 31, the procedure will be as follows: To draw in the cable 35 the operator shifts the friction control lever 155 into the position shown in Fig. 29, so as to couple the cable drum to the gear 101, and then shifts the lever 214 first into the position shown in Fig. 29 and then into the position shown in Fig. 3. When the lever 214 moves into the Fig. 3 position, the clutch becomes effective and the engine will be coupled through the clutch and the friction device to the cable drum and will operate it in a direction to draw in the cable 35.

Assuming that at this time the bucket 294 has a load in it, this load will tend to draw out the cable whenever it has the opportunity. Therefore, when the operator has drawn the cable 35 inwardly as far as desired, he will shift the lever 214 into the position shown in Fig. 29, at which time the clutch mechanism connecting the source of power to the pinion 161 will be open and further drawing in of the cable will stop. Automatically, however the safety brake mechanism becomes active, and at the very start of the outward movement of the cable under the load, the safety brake is applied and holds the load in elevated position without any exertion on the part of the operator, because the holding operation is entirely mechanical.

If, however, the operator desires to allow the load to descend or the cable to be paid out he may do either of two things. He may shift the friction lever 155 from the position shown in Fig. 29 and in Fig. 3 to the position shown in Fig. 31, so as to disconnect the cable drum from the gear 101, whereupon the cable will rotate the drum as the load descends and this rotation of the drum may be controlled by the operator merely by the depression of the pedal 100. This paying out of the cable may be checked at will by the operation or the depression of the pedal 100.

Figure 3:
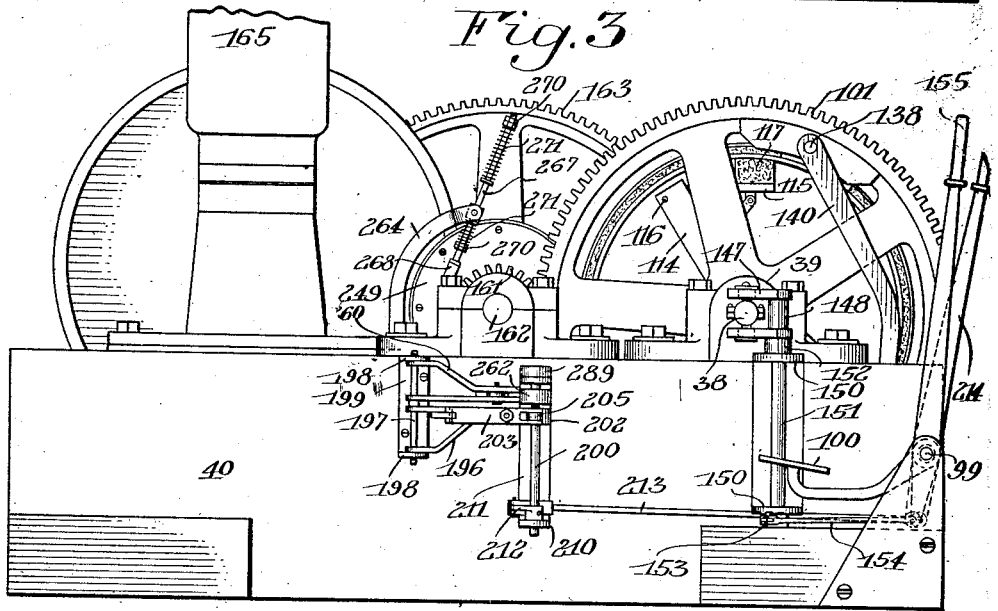
Fig. 3 is another and opposite side elevation of the same.

On the other hand if the operator has left the friction lever in the position shown in Figs. 3 and 29, he may shift the clutch lever 214 from the position shown in Fig. 29 to the position shown in Fig. 31 during which the clutch will still remain disengaged or uncoupled and the safety brake mechanism would be rendered inactive so that the load would descend under the control of the brake mechanism which is manipulated by the pedal 100. This descent could be stopped at any time by moving the clutch lever 214 back into the intermediate position to reset the automatic safety brake.

From the foregoing description it will be obvious that with this improved mechanism, the transfer of power may be selectively controlled, and the movements of the controlled member, such as a cable drum, in both directions selectively controlled with perfect safety. The only effort required to control the movements of the controlled member, such as a cable drum, is the effort necessary to manipulate the pedal 100 and the levers 155 and 214, even though the actual power required for the operation of the clutch, friction device or the brakes may be relatively great owing to the great forces to be controlled. The control of the various parts is mechanical but the operations with the exception of the safety brake are initiated manually. Such a device is particularly effective, easily handled, and gives perfect and safe control under all operating conditions.

While the invention has been described in connection with the operation of a cable drum, it will be understood that this has been done only for the purpose of explaining the nature of the invention, and that the various features such as the clutch, the brakes and friction device may be utilized in other relations where similar problems must be handled. Therefore, the present description is to be considered merely as explanatory of the principle of the invention, and not as necessarily limiting. It will be further understood that various changes in the details, which have been mentioned in describing this embodiment of the invention, may be made by those skilled in the art within the principle and scope of the invention as expressed in the appended claims.

I claim as my invention:

1. Power transfer and control mechanism comprising a source of power, an element to be power operated in one direction and its movements in the opposite direction controlled, a clutch and a friction device individually controlled and connected in series to one another and to said element and said source of power, for coupling said source of power to said element when the latter is to be power operated, an automatic brake associated with the connection between the clutch and friction device for automatically and frictionally stopping reverse movement of said element, and manually controlled means for setting said brake to be effective or ineffective as desired.

2. Power transfer and control mechanism comprising a source of power, an element to be power operated in one direction and its movements in the opposite direction controlled, a clutch and a friction device individually controlled and connected in series to one another and to said element and said source of power, for coupling said source of power to said element when the latter is to be power operated, an automatic brake associated with the connection between the clutch and friction device for automatically and frictionally stopping reverse movement of said element, manually controlled means for setting said brake to be effective or ineffective as desired, and a variable brake device directly connected to said element for variably controlling its movement in said opposite direction when said automatic brake is ineffective thereon.

3. Power transfer and control mechanism, comprising a source of power, an element part whose movements are to be controlled, and means for coupling the source of power to said element part and uncoupling it therefrom selectively, said means including a member part movable in a path adjacent to said element part, a friction device carried by one of said parts and frictionally engageable with the other of said parts to cause their concomitant movement together, and manually controlled friction means connected between said parts and to said device, and utilizing the relative movement between said parts to apply the friction device mechanically whenever said friction means is manually operated for that purpose.

4. Power transfer and control mechanism comprising a source of power, a cable drum whose movements are to be controlled, said drum having friction flanges, a clutch and a friction device individually controlled and connected in series to one another and to said drum and said source of power for coupling said source of power to said drum when the drum is to be positively operated in one direction, said friction device being provided in the connection between the clutch and the drum and operable upon one of the flanges of the drum, an automatic brake for the connection between the clutch and friction device for automatically and frictionally stopping movement of said drum reverse to said one direction, means for selectively setting said brake to be effective or ineffective as desired, and means associated with the other flange of the drum for frictionally controlling the movement of the drum in said reverse direction.

5. Power transfer and control mechanism comprising a source of power, a cable drum whose movements are to be controlled, said drum having friction flanges, a clutch and a friction device individually controlled and connected in series to one another and to said drum and said source of power for coupling said source of power to said drum when the drum is to be positively operated in one direction, said friction device being provided in the connection between the clutch and the drum and operable upon one of the flanges of the drum, an automatic brake for the connection between the clutch and friction device for automatically and frictionally stopping movement of said drum reverse to said one direction, means for selectively setting said brake to be effective or ineffective as desired, and means associated with the other flange of the drum for frictionally controlling the movement of the drum in said reverse direction, said last named means being selectively adjustable to vary the degree of frictional resistance which it offers to the operation of the drum.

6. In power transfer and control mechanism, the combination of an element, whose movements are to be controlled, having a friction surface, a brake device associated with said surface and adjustable to variably grip the same and thus variably control the movements of said element, mechanical power means connected to said brake for mechanically operating it, a friction device associated with said element and connected to said mechanical device for operation thereof, and variable means for forcing said friction device into contact with said element to cause a mechanical application of the brake.

7. In power transfer and control mechanism, the combination of a member whose movements are to be controlled, said member having a flange, a brake band associated with said flange and adjustable to frictionally grip the same and variably check its movements, a shoe also associated with said flange, movable in the direction of the movement of said flange and adjustable into and out of contact with said flange, means connecting said shoe and brake for causing a mechanical application of the brake when said shoe is driven by said flange, and means for pressing said shoe variably into contact with the flange to cause variable effectiveness of the brake upon the flange.

8. In power transfer and control mechanism, the combination of a member whose movements are to be controlled, another member mounted adjacent said first member for movement in a parallel path, a friction device carried by one of said members and frictionally engageable with the other to couple them, means having a lost motion connection to said one of the members and also connected to said friction device for operating it, means yieldingly holding the last named means at the end of the lost motion at which the friction device is ineffective, said friction operating means including an element shiftable into and out of contact with the other of said members to be driven thereby and cause a tightening of the friction device by the driving of said friction operating means from said other of the members, and means for controlling the movements of said element into and out of driving relation with said other of the members.

9. In power transfer and control mechanism, the combination of a member whose movements are to be controlled, another member mounted adjacent said first member for movement in a parallel path, a friction device carried by one of said members and frictionally engageable with the other to couple them, means having a lost motion connection to said one of the members and also connected to said friction device for operating it, means yieldingly holding the last named means at the end of the lost motion at which the friction device is ineffective, said friction operating means including an element shiftable into and out of contact with the other of said members to be driven thereby and cause tightening of the friction device by the driving of said friction operating means from said other of the members, and means for controlling the movements of said element into and out of driving relation with said other of the members, said last named means including a manually operable cam effective upon said element at any point in the movement of said members to cause their coupling or uncoupling.

10. In power transfer and control mechanism, a rotary member whose movements are to be controlled, a second member mounted for rotation adjacent the first member and about the same axis, a friction device carried by one of said members and engageable with the other of said members to frictionally couple them, an element also mounted for rotation about the said axis and having a lost motion connection to said one of the members, said element also having a connection to said friction device for operating it upon relative movement of said element and one of the members, said element including a friction shoe shiftable into and out of contact with the other of said members and also including means for operating said shoe into and out of engagement with said other of the members, and a cam device operable upon said last named means at any point in the rotation of said element for causing a movement of said shoe into and out of driving engagement with said other of the members.

11. In power transfer and control mechanism a shaft, a pair of members mounted on the shaft adjacent one another and rotatable relatively to one another about the axis of the shaft, a friction device carried by one of said members and engageable with the other to frictionally couple them for movement together about said axis, mechanism connected to said friction device for operating the same, an element also mounted on said shaft for movement about its axis and connected to said mechanism for operating the same, a friction shoe carried by said last mentioned element for movement thereon into and out of frictional engagement with the other of said members, a cam mounted on said shaft for movement in a direction endwise thereof, and means also carried by said element, connected to said shoe, and having an operating portion in the path of said cam during endwise movement of the latter for causing movement of said shoe into and out of driving relation with said other of the members, whereby endwise operation of the cam will cause an operation of the friction device to frictionally couple or uncouple the said members by their relative movement.

12. In power transfer and control mechanism, a clutch comprising a pair of members to be coupled or uncoupled, means carried by one of said members for rotation therewith and adjustable thereon into and out of coupled engagement with the other of said members, a pair of elements also mounted on said one of the members, one element being fixed to said one of the members and the other being rotatable and slidable thereon, means coupling said elements whereby their relative rotation will cause their relative separation or approach, and a controlling element connected to said slidable element and shiftable into and out of engagement with the other of said members, whereby when said controlling element is shifted into frictional engagement with said other of the members the resulting movement therewith of said controlling element and said movable element will cause a separation of said two elements and a mechanical forcing of said coupling means into engagement with said other of the members to cause movement together of said members.

13. In power transfer and control mechanism, a clutch comprising a pair of members to be coupled or uncoupled, means carried by one of said members for rotation therewith and adjustable thereon into and out of coupled engagement with the other of said members, a pair of elements also mounted on said one of the members, one element being fixed to said one of the members and the other being rotatable and slidable thereon, means coupling said elements whereby their relative rotation will cause their relative separation or approach, a controlling element connected to said slidable element and shiftable into and out of engagement with the other of said members, whereby when said controlling element is shifted into frictional engagement with said other of the members the resulting movement therewith of said controlling element and said movable element will cause a separation of said two elements and a mechanical forcing of said coupling means into engagement with said other of the members to cause movement together of said members, and manual means for causing shifting movements of said controlling element.

14. In power transfer and control mechanism, a clutch comprising a pair of members to be coupled or uncoupled, said members being rotatable about a common axis and in proximity to one another, a clutch element mounted on one of said members for rotation therewith and adjustable along the axis of rotation of said members into and out of contact with the other of said members to cause a direct coupling or uncoupling of said members, an abutment on said one of the members rotatable therewith, an element mounted for rotation on said one of the members about said axis of rotation, means connecting said last named element and said abutment for causing movement of that element in a direction along the axis of rotation upon relative rotary movement of that element and the abutment, means connecting said elements whereby when the element that is rotatable on said one of the members is moved relatively to said abutment it will force the other element into coupled engagement with the said other of said members, a third element connected to said second element and adjustable relatively thereto into and out of frictional driving engagement with said other of the members, whereby when the third element is coupled to said other of the members it will cause relative movement of the second element and said abutment to force the first element mechanically into coupled engagment with said other of the members, and means by which said third element may be adjusted into and out of driving relation with said other members independently of the rotation of said members.

15. In power transfer and control mechanism, a clutch comprising a pair of members to be coupled or uncoupled, said members being rotatable about a common axis and in proximity to one another, a clutch element mounted on one of said members for rotation therewith and adjustable along the axis of rotation of said members into and out of contact with the other of said members to cause a direct coupling or uncoupling of said members, an abutment on said one of the members rotatable therewith, an element mounted for rotation on said one of the members about said axis of rotation, means connecting said last named element and said abutment for causing movement of that element in a direction along the axis of rotation upon relative rotary movement of that element and the abutment, means connecting said elements whereby when the element that is rotatable on said one of the members is moved relatively to said abutment it will force the other element into coupled engagement with the said other of said members, a third element connected to said second element and adjustable relatively thereto into and out of frictional driving engagement with said other of the members, whereby when the third element is coupled to said other of the members it will cause relative movement of the second element and said abutment to force the first element mechanically into coupled engagement with said other of the members, means by which said third element may be adjusted into and out of driving relation with said other members independently of the rotation of said members, and spring means for shifting said first element out of coupled engagement with said other of the members when said third element is uncoupled from said other of the members.

16. In power transfer and control mechanism, safety brake apparatus comprising a member whose movements are to be controlled mounted for rotation, a second member mounted for rotation about the same axis and shiftable in a direction endwise of the axis and relatively to said member to be controlled, said members having frictionally engaging parts whereby they may, by their relative movement endwise of said axis, be coupled for frictional movement together, a third member also shiftable in a direction endwise of said axis for causing relative movement of said first two members in a direction endwise of the axis, and to create a rotary frictional drag between said first and second members, means for holding the third member against rotation and for shifting it endwise of said axis selectively, said second and third members having cooperating cam surfaces for causing movement of said second member into frictional driving relation with said first member upon movement of said second member in one rotary direction, and a brake device effective upon said first member and connected for operation to said second member, whereby when said second member is confined against said first member by said third member any movement of said first member in a direction to cause relative axial movement of said second and third members by the cam surfaces will cause a tightening of the brake device upon said first member.

17. In power transfer and control mechanism, safety brake apparatus comprising a member whose movements are to be controlled mounted for rotation, a second member mounted for rotation about the same axis and shiftable in a direction endwise of the axis, and relatively to said member to be controlled, said members having frictionally engaging parts whereby they may by their relative movement endwise of said axis be coupled for frictional movement together, a third member also shiftable in a direction endwise of said axis for causing relative movement of said first two members in a direction endwise of the axis, and to create a rotary frictional drag between said first and second members, means for holding the third member against rotation and for shifting it endwise of said axis selectively, said second and third members having cooperating cam surfaces for causing movement of said second member into frictional driving relation with said first member upon movement of said second member in one rotary direction, a brake device effective upon said first member and connected for operation to said second member, whereby when said second member is confined against said first member by said third member any movement of said first member in a direction to cause relative axial movement of said second and third members by the cam surfaces will cause a tightening of the brake device upon said first member, and spring means for resisting the frictional drag between said first and second members when said first member is operating in a direction in which the cam surfaces are ineffective and the brake mechanism is ineffective.

18. In power transfer and control mechanism, safety brake apparatus comprising a member whose rotary movements are to be controlled; an element mounted for rotation about the same axis and shiftable along the axis into more or less frictional engagement with said member and having some frictional drag thereon, a second element abutting against the first element, said elements having cooperating cam surfaces whereby movement of said first element in one direction about said axis will cause its movement into greater frictional engagement with said member, a brake device operative upon said member and having a mechanical power connection to said first element, whereby rotation of said first element in one direction with said member will cause a mechanical operation of the brake device to stop this rotation, and whereby rotation of said member in the other direction will be resisted only by the minimum frictional drag between said first element and said first member.

19. Power transfer and control mechanism comprising a source of power, an element to be power operated in one direction and its movements in the opposite direction controlled, and means for connecting the source of power to said element, including a clutch and a friction device individually controlled and connected in series to one another and to said element and said source of power, an automatic brake associated with said means between the clutch and the friction device for automatically and frictionally stopping the movement of said element in a direction opposite that in which it is power operated, said brake being adjustable into a condition in which it is inactive for all movements of said element, means for controlling said clutch means, means for adjusting said brake to be effective or ineffective as desired, means for controlling said last two means, including a common operating member and controlling cams effective upon the last two mentioned means, and means for controlling the effectiveness of said friction device.

20. Power transfer and control mechanism comprising a source of power, an element to be power operated in one direction and its movements in the opposite direction controlled, and means for connecting the source of power to said element, including a clutch and a friction device individually controlled and connected in series to one another and to said element and said source of power, an automatic brake associated with said means between the clutch and the friction device for automatically and frictionally stopping the movement of said element in a direction opposite that in which it is power operated, said brake being adjustable into a condition in which it is inactive for all movements of said element, means for controlling said clutch means, means for adjusting said brake to be effective or ineffective as desired, means for controlling said last two means, including a common operating member and controlling cams effective upon the last two mentioned means, means for controlling the effectiveness of said friction device, and separate means for frictionally retarding the reverse movement of said element, in a direction opposite from that in which it is power operated, when the automatic brake is ineffective, or said frictional device is uncoupled from said element.

21. A power transfer and control mechanism comprising a source of power, a rotary work element, driving means arranged to be driven by the power means and including a driven element, clutch means rotatable with the driven element for driving the rotary work element when coupled therewith and friction means associated with the clutch means arranged to be coupled with the rotary work element whereby to cause the clutch means to operate said element.

22. A power transfer and control mechanism comprising a source of power, a rotary work element, driving means arranged to be driven by the power means and including a driven element, clutch means rotatable with the driven element for driving the rotary work element when coupled therewith, a friction means associated with the clutch means arranged to be coupled with the rotary work element whereby to cause the clutch means to operate said element, a brake for the work element, actuating mechanism for the brake and means for coupling the actuating mechanism with the work element whereby the latter is made to apply the brake.

23. In a power transfer and control mechanism, a source of power, a rotary work element to be power operated in one direction, a rotary member adjacent the work element, clutch means for coupling said member with said element, a drive shaft connected with the source of power, a driving element for said rotary member rotatable upon said shaft, a releasable clutch upon the shaft for operating said driving element, an automatic brake for holding the driving element against reverse rotation by said rotary member when said clutch is released and means for conditioning the brake for automatic operation upon release of the clutch.

24. In a power transfer and control mechanism, a source of power, a rotary work element to be power operated in one direction, a rotary member adjacent the work element, clutch mechanism rotatable therewith including a part movable for cooperation with the rotary work element whereby to effect coupling of the clutch with the latter, driving means interposed between the source of power and said rotary member including a driving element for the latter, a releasable clutch connected with the power means for operating the driving element, an automatic brake arranged to be operated by the driving element for holding the latter in check upon reverse movement thereof when the clutch is released and manually controlled means for releasing the clutch and for setting the brake for operation upon release of the clutch.

25. In a power transfer and control mechanism, a source of power, a rotary work element, means connected with the source of power for driving the rotary work element in one direction and for checking reverse rotation thereof, comprising interconnected driving mechanisms, each including a clutch and an automatic brake for one of the driving mechanisms adapted for checking reverse rotation thereof by the other driving mechanism when its clutch is in gripping position with respect to the rotary work element.

26. A power transfer and control mechanism, comprising a source of power, a rotary work element, driving means arranged to be driven by the power means and including a driven element, clutch means carried by the driven element arranged to drive the rotary work element when coupled therewith, friction means connected with and arranged for rotation by the clutch means and being manually movable to frictionally engage the rotary work element whereby to cause the clutch means to operatively engage said work element.

27. A power transfer and control mechanism comprising a source of power, mechanism arranged to be driven thereby including a shaft and an operating element rotatable therewith, a work element mounted for rotation about the axis of the shaft and adjacent the operating element, a clutch rotatable with the operating element adapted for engagement with the rotary work element to drive the latter, an operating lever for the clutch rotatable therewith, a support rotatably mounted upon the shaft, a connection between said lever and said support for rotating the latter, a friction device carried by the support for engagement with the rotary work element adapted upon engaging the latter to cause relative movement between the support and the lever whereby the latter is operated to couple the clutch with said rotary work element and means for effecting movement of the friction device into engagement with the rotary work element.

28. In a power transfer means, a rotary work element, a shaft upon which said element is free to rotate, an operating element rotatable with the shaft, a clutch rotatable with the operating element adapted for engagement with the rotary work element to drive the latter, an operating lever for the clutch rotatable with the operating element, a support rotatably mounted upon the shaft, a connection between said lever and said support for rotating the latter, a friction device carried by the support for engagement with the rotary work element adapted upon engaging the latter to cause relative movement between the support and lever whereby the latter is operated to couple the clutch with said rotary work element and means for effecting movement of the friction device into engagement with the rotary work element.

29. In a power transfer means, a rotary member, a rotary work element, clutch means carried by said rotary member arranged to drive the rotary work element when coupled therewith, and friction means connected with and arranged for rotation by the clutch means and being manually movable to frictionally engage the rotary work element whereby to cause the clutch means to operatively engage the work element.

30. In a power transfer means, a driven shaft, a rotary work element, a driving element rotatable upon the shaft and operatively connected with said work element, a releasable clutch upon the shaft for rotating the driving element, a brake for checking reverse rotation of the driving element when the clutch is released arranged to be automatically operated by said driving element upon reverse movement thereof, a manually operable member, and means under the control of said member for releasing the clutch and rendering the brake effective for automatic operation by the driving element.

LEO R. HEISLER.